US007887284B2

(12) United States Patent
Merswolke et al.

(10) Patent No.: US 7,887,284 B2
(45) Date of Patent: Feb. 15, 2011

(54) WIND TURBINE TO PRODUCE ELECTRICITY

(75) Inventors: Paul H. F. Merswolke, Bogner (CA); Na'al S. Nayef, Orangeville (CA)

(73) Assignee: New World Generation Inc., Owen Sound, Ontario (CA)

( * ) Notice: Subject to any disclaimer, the term of this patent is extended or adjusted under 35 U.S.C. 154(b) by 1000 days.

(21) Appl. No.: 10/596,314

(22) PCT Filed: Dec. 9, 2004

(86) PCT No.: PCT/CA2004/002099

§ 371 (c)(1),
(2), (4) Date: Jun. 8, 2006

(87) PCT Pub. No.: WO2005/057008

PCT Pub. Date: Jun. 23, 2005

(65) Prior Publication Data

US 2007/0166147 A1   Jul. 19, 2007

(51) Int. Cl.
*F03D 7/02* (2006.01)
(52) U.S. Cl. ............................ 415/4.3; 416/14; 416/41; 416/196 A
(58) Field of Classification Search .............. 415/4.1, 415/4.3, 4.5, 10, 11, 14, 41, 46, 189, 195, 415/196 A, DIG. 4, DIG. 6; 416/10, 11, 416/14, 41, 46, 189, 195, 196 A, DIG. 4, 416/DIG. 6
See application file for complete search history.

(56) References Cited

U.S. PATENT DOCUMENTS

| 4,350,895 A | | 9/1982 | Cook |
| 4,729,716 A | | 3/1988 | Schmidt |
| 5,315,159 A | * | 5/1994 | Gribnau .................... 290/55 |
| 6,951,443 B1 | * | 10/2005 | Blakemore ................ 415/4.3 |
| 2004/0086373 A1 | | 5/2004 | Page, Jr. |

FOREIGN PATENT DOCUMENTS

| FR | 2394689 | | 1/1979 |
| FR | 2394689 A | * | 2/1979 |
| WO | WO 2004092580 A1 | | 10/2004 |

* cited by examiner

*Primary Examiner*—Edward Look
*Assistant Examiner*—Dwayne J White
(74) *Attorney, Agent, or Firm*—Daryl W. Schnurr

(57) ABSTRACT

A wind turbine has a hub mounted on a rotatable shaft with a ring concentrically mounted on the shaft. The ring is connected to drive wheels, which in turn drive generators to produce electricity. A controller is connected to control the speed of the turbine by controlling the number and force of contact between the wheels and the ring and also controlling other components such as the pitch, yaw and brakes for the turbine while monitoring the wind conditions.

23 Claims, 36 Drawing Sheets

WIND TURBINE TO PRODUCE ELECTRICITY

BACKGROUND OF THE INVENTION

1. Field of Invention

This invention relates to a wind turbine producing energy and, more particularly, to a wind turbine having a hub mounted on a rotatable shaft with a ring concentrically mounted on the shaft, the ring driving energy producing equipment.

2. Description of the Prior Art

Wind turbines, including windmills, are known and are used to power energy production equipment including generators, compressors or pumps, as well as other devices. It is known to have the wind turbine connected to a shaft and the rotational energy in the shaft is then used to drive the energy producing equipment. Windmills or wind turbines have gear boxes to transfer energy from the blades through the shaft to energy producing equipment. It is known to use wind turbines to produce electrical energy, but great difficulty has been encountered in producing 60 cycle electricity using wind turbines. Without 60 cycle electricity, the output from previous wind turbines cannot be connected to a grid system of an electrical utility without being energized by the grid. The difficulty of producing 60 cycle electricity arises because the wind velocity constantly changes and therefore the speed of rotation of the blades of the wind turbine varies. Further, electrical energy cannot be produced by a wind turbine during periods when the wind is not blowing or is not blowing at a sufficient velocity to rotate the wind turbine. Previous windmills also have significant power limitations due mainly to the gearbox. Previous wind turbines do not have a power capacity that exceeds 3.5 MW.

SUMMARY OF THE INVENTION

It is an object of the present invention to provide a wind turbine that can be controlled to operate energy producing equipment at a constant rate of speed. It is a further object of the present invention to provide a wind turbine where the output has a constant rate of speed even though the blades of the turbine rotate at varying speeds. It is a further object of the present invention to provide a wind turbine that can be controlled to drive energy producing equipment at a substantially constant rate of speed and to produce energy economically.

A turbine powered by wind comprises a rotor on a shaft. The rotor has a blades extending outward therefrom, the blades being shaped to rotate the shaft when the wind is sufficiently strong. The shaft is rotatably supported on a support that can move the blades in a yaw movement into and out of the wind as the wind changes direction. The turbine has a pitch adjustment mechanism. The shaft has a ring concentrically mounted on the shaft. A plurality of rotators is mounted to removably contact the ring. The rotators are connected to drive energy producing equipment. The rotators are constructed to rotate with the ring when the rotators are in contact therewith, thereby driving the energy producing equipment when the wind rotates the blades. A controller is connected to control a speed of the turbine when the wind is sufficiently strong and to independently control each contact between said rotators and said ring. Preferably, the rotor has a hub located between the shaft and the blades.

Further, the blades preferably each have a post extending outward from the hub with a blade shaped portion mounted on an outer portion of the post.

DESCRIPTION OF A PREFFERED EMBODIMENT

Figure 1:
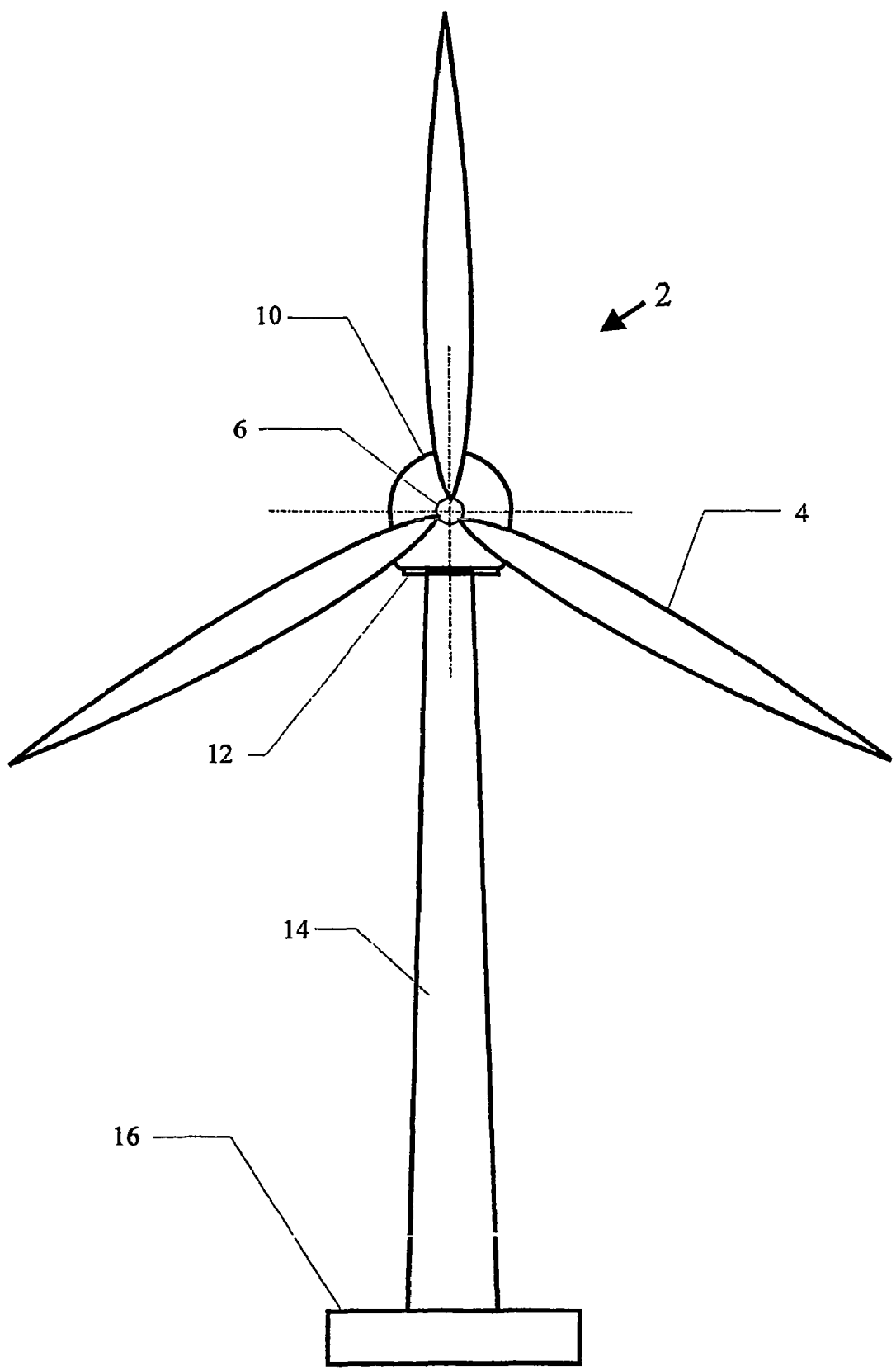
FIG. 1 is a front view of a wind turbine.
Figure 2:
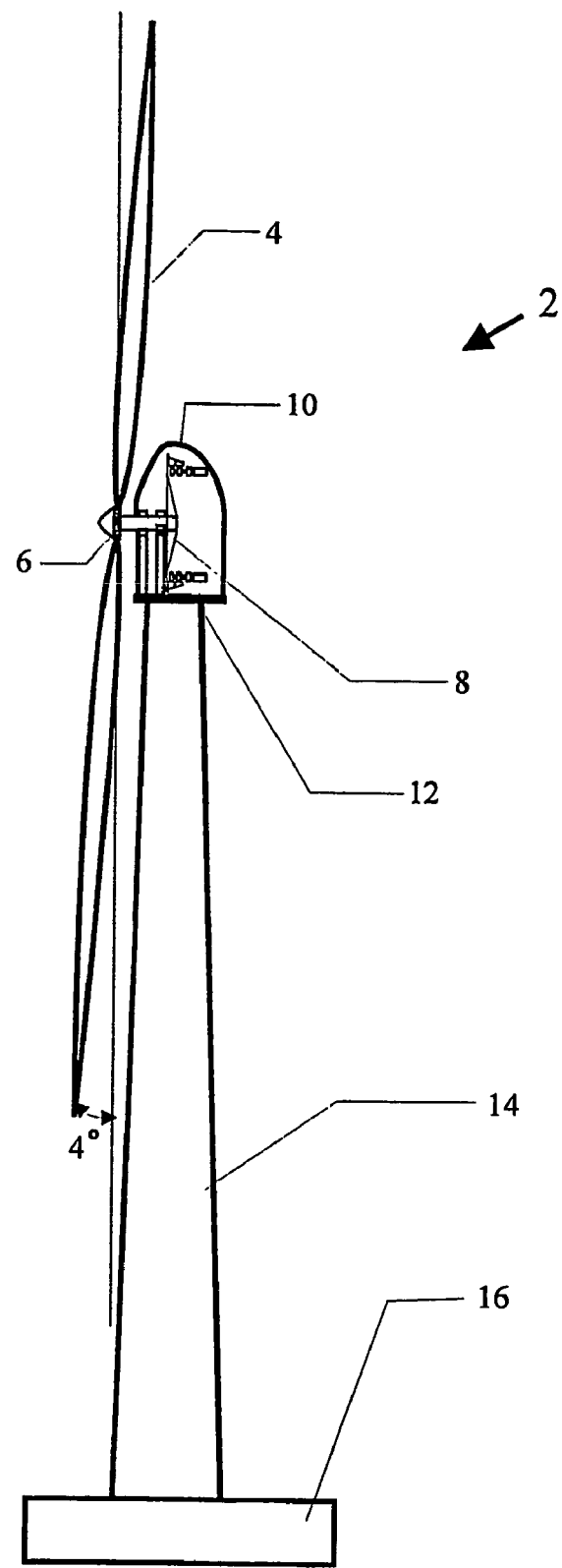
FIG. 2 is a side view of a wind turbine.

In FIGS. 1 and 2, there is shown a wind turbine 2 having three blades 4 mounted equidistant from one another on a hub 6. The hub 6 is connected to a rotatable shaft 8 extending into a generator housing 10. The housing 10 is mounted on a turntable 12, which in turn is mounted on a tower 14 having a foundation 16. From the dotted line in FIG. 2, it can be seen that the blades can be tilted forward at the top and rearward at the bottom by 4°. The tilt of the blades is adjusted by installing a different hub.

Figure 3:
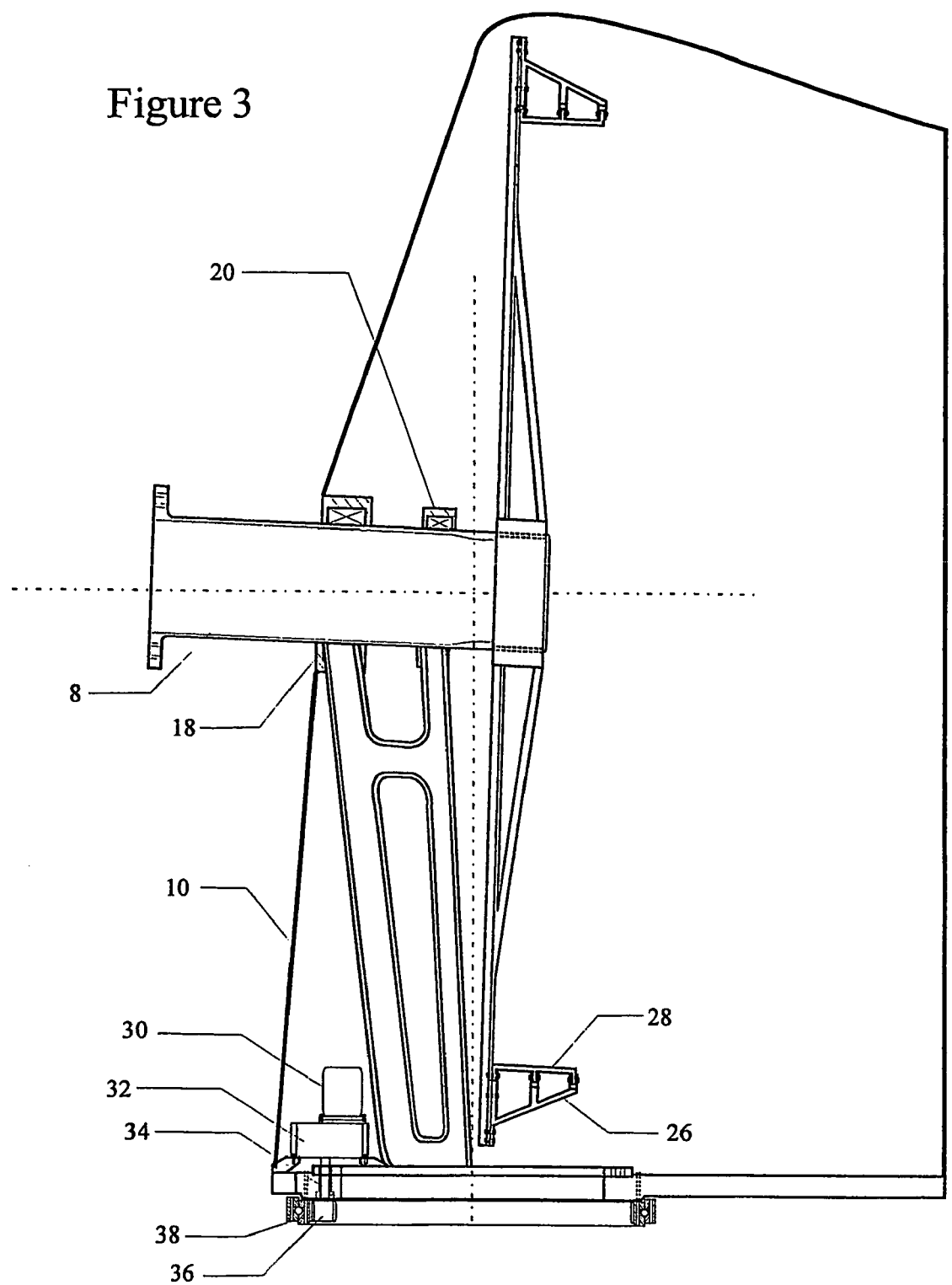
FIG. 3 is an enlarged side view of a shaft and ring.

In FIG. 3, there is shown an enlarged side view of the generator housing 10. It can be seen that the shaft 8 is rotatably mounted within the housing 10 on a front bearing 18 and a rear bearing 20. The housing contains a generator assembly support structure (not shown in FIG. 3). A ring 26 is concentrically mounted on the shaft 8 with the hub 6 (not shown in FIG. 3), the ring having a contact surface 28 that is substantially parallel to the shaft 8. The housing 10 has electrical drive motors 30 at either side of a front thereof (only one of which is shown) connected to a gear reducer 32, a pinion shaft 34, a pinion 36 and a ball bearing 38 to cause the generator housing 10 to rotate in a yaw motion. Of course, when the generator housing rotates, the shaft and blades rotate in a yaw motion simultaneously.

Figure 4:
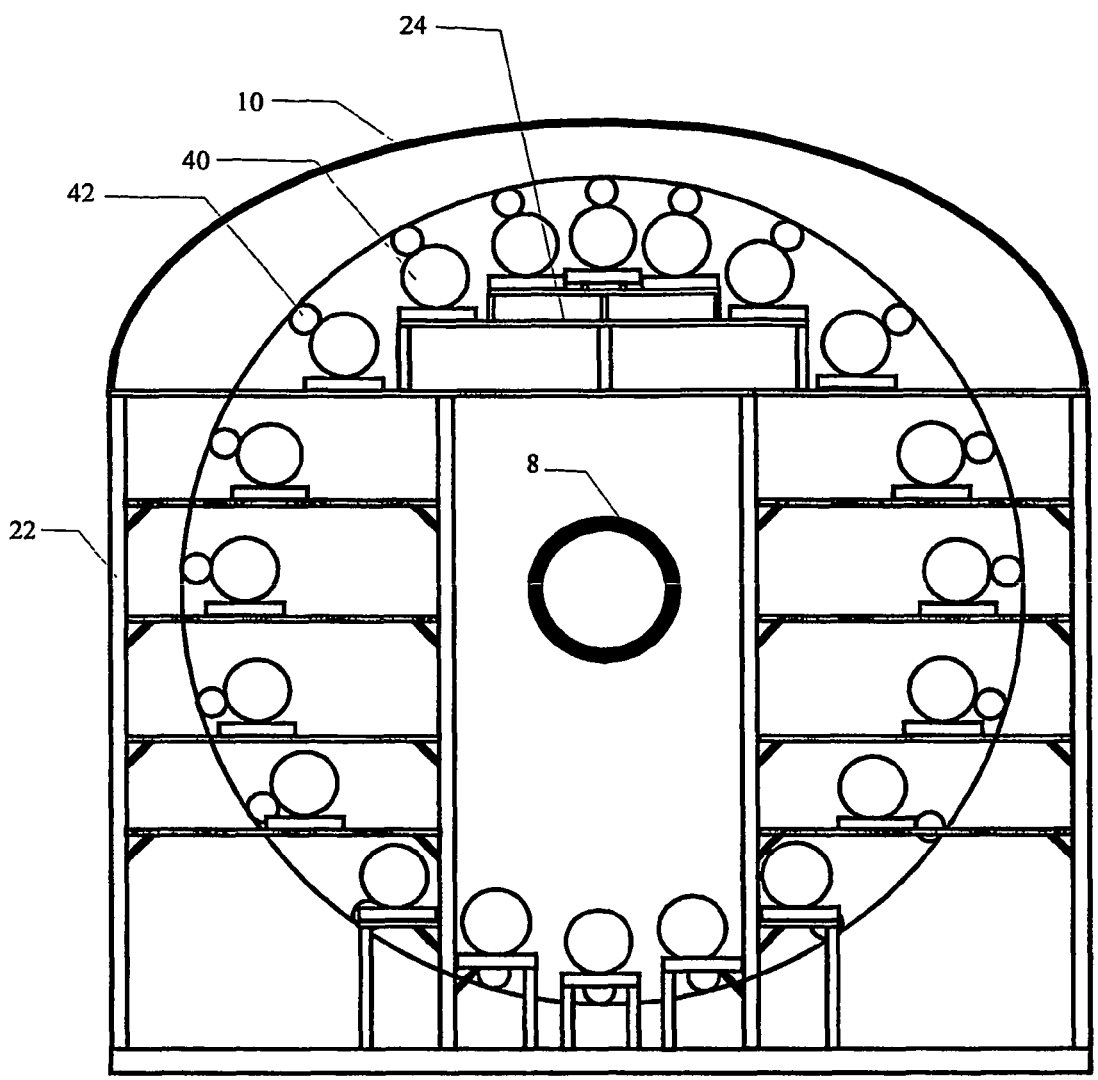
FIG. 4 is a front view of a generator layout.

In FIG. 4, there is shown a front view of the generator housing 10. It can be seen that generators 40 having tires 42 connected to drive the generators. The generators are mounted on a support structure 22 having on support plates 24, a circular arrangement corresponding to the ring 26 (not shown in FIG. 4). The tires are mounted so that they can be removably moved into and out of contact with the contact surface 28 of the ring 26. The tires are controllable independently so that the force of each tire on the contact surface can be controlled as well as movement of each tire into and out of contact with the ring 26.

Figure 5:
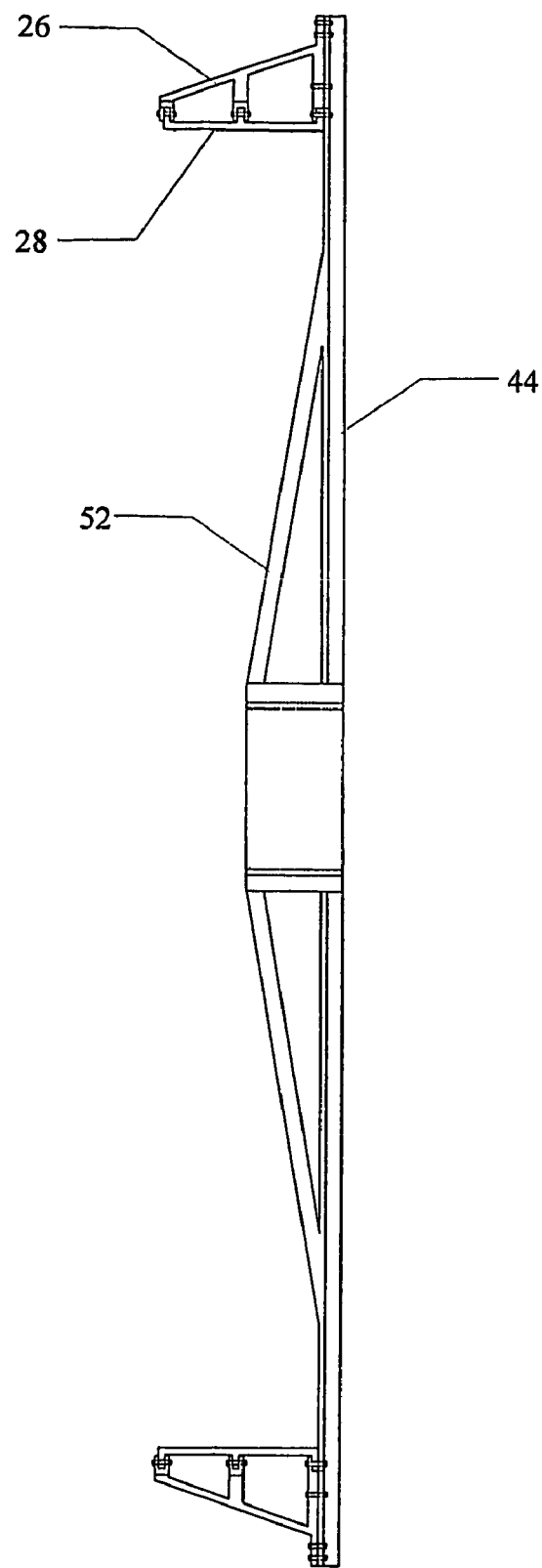
FIG. 5 is an enlarged side view of a ring.
Figure 6:
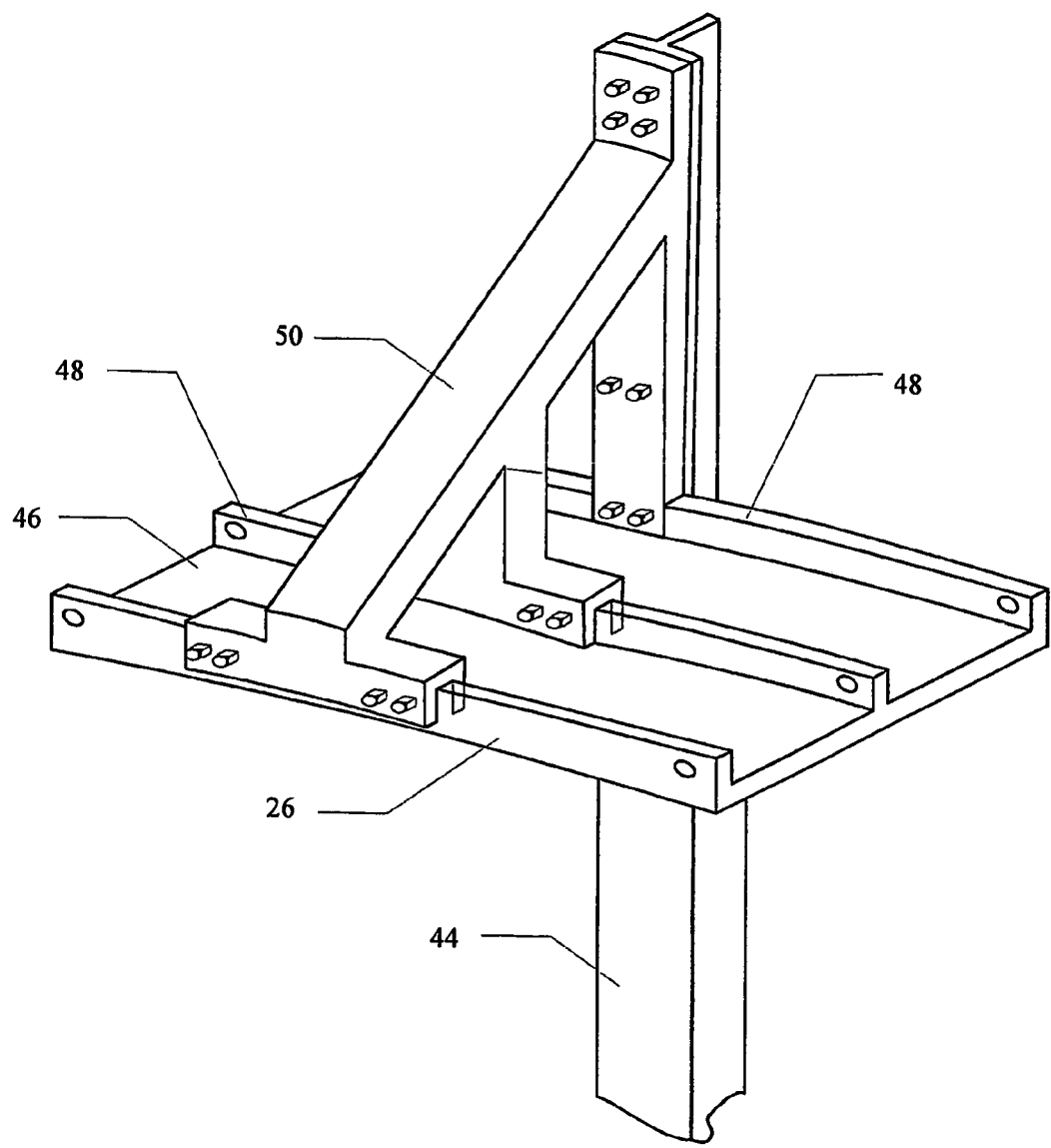
FIG. 6 is a perspective view of part of a ring.

In FIG. 5, there is shown an enlarged side view of the ring 26 with the contact surface 28; The ring 28 has spokes 44 (only one of which is shown) and an arm 52 extending from each spoke 44. In FIG. 6, there is shown a perspective view of part of the ring 26 and the spoke 44. The ring 26 has an outer surface 46 with ribs 48 located thereon. An angle bracket 50 connects the ring 26 to the spoke 44. There are a plurality of spokes 44 (only one of which is shown) extending outward from the shaft 8 (not shown in FIG. 6). On each spoke 44, there is an angle bracket 50 connecting the ring 26 to the spoke 44. The same reference numerals are used in FIGS. 5 and 6 as those used in FIG. 3 for those components that are identical.

Figure 7:
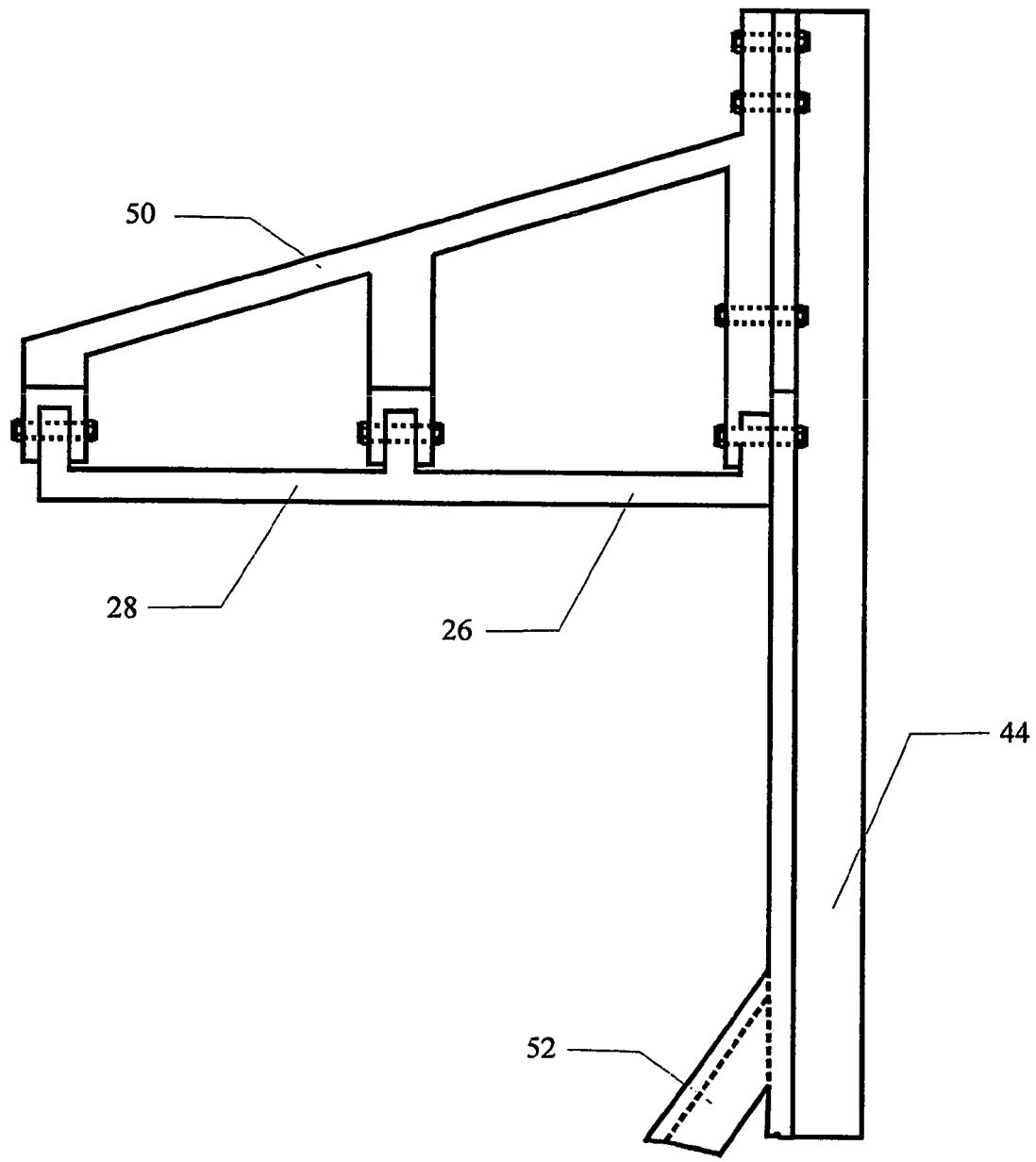
FIG. 7 is a side view of part of ring.

In FIG. 7, there is shown a side view of the connection between the ring 26 and the spoke 44. The same reference numerals are used in FIG. 7 as those used in FIG. 6 to describe those components that are identical. An arm 52 extends at an angle to provide strength to the spoke 44 (see FIG. 5 as well).

Figure 8:
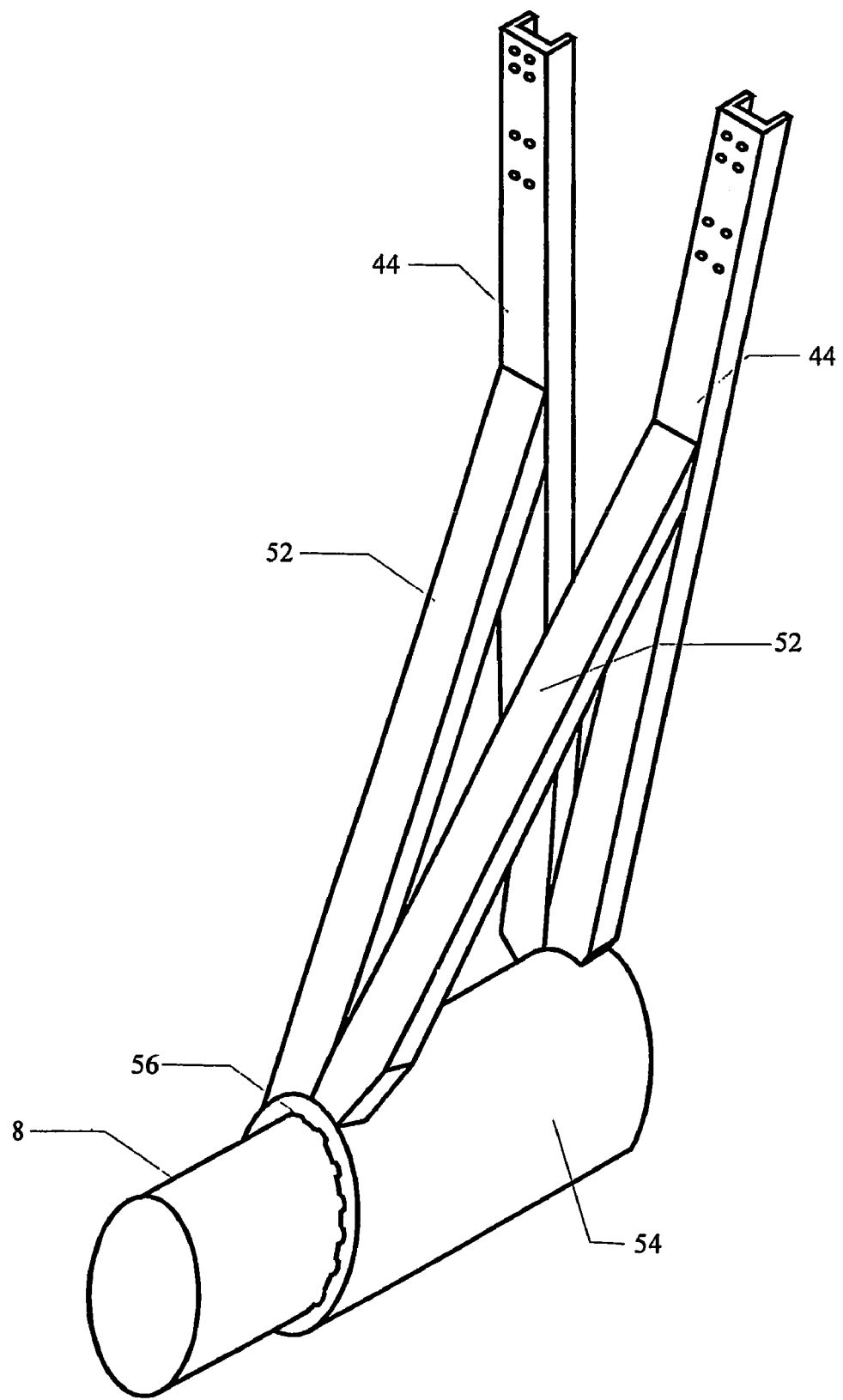
FIG. 8 is a partial perspective view of two spokes connected to the shaft.

In FIG. 8, there is shown a perspective view of the spoke 44 connected to a sleeve 54 that is concentrically mounted on the shaft 8. The same reference numerals are used in FIG. 8 to describe those components that are identical to the components of FIGS. 6 and 7. It can be seen that sleeve 54 is shaped to receive splines 56 located equidistant from one another around the circumference of the shaft 8.

Figure 9:
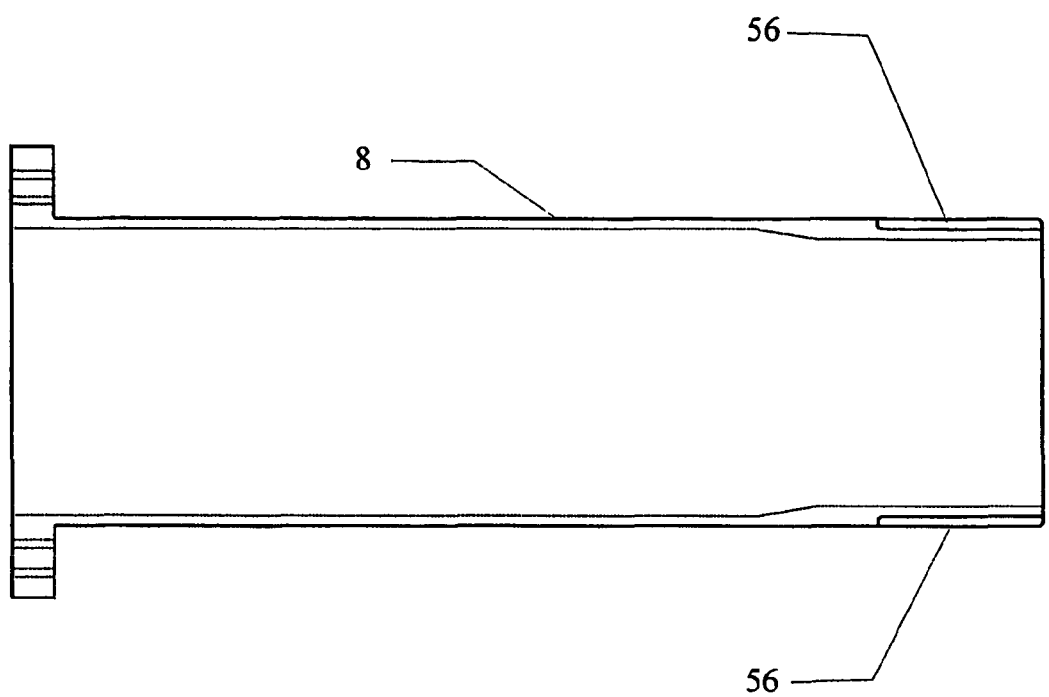
FIG. 9 is a side view of the shaft with splines at one end.
Figure 10:
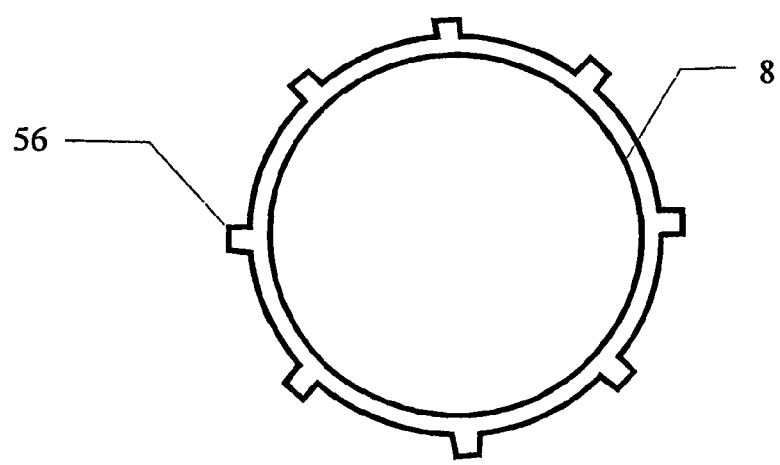
FIG. 10 is an end view of a shaft having splines around a circumference.

In FIG. 9, there is shown a side view of the shaft 8 with splines 56 on the shaft 8 at one end. In FIG. 10, there is shown an end view of the shaft 8 showing the splines 56.

Figure 11:
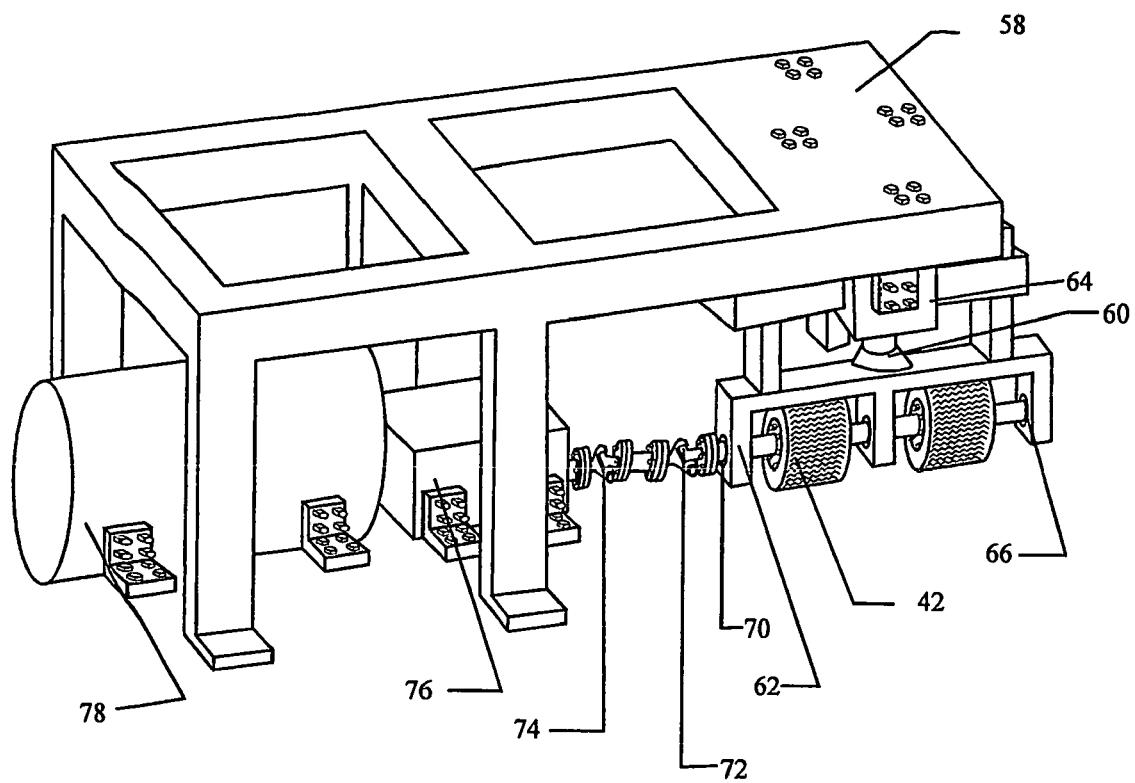
FIG. 11 is a perspective view of a generator and tire assembly.

In FIG. 11, there is shown a perspective view of a tire assembly mount 58 having a hydraulic cylinder 60 connected between the tire assembly mount 58 and an E-shaped bracket 62. The hydraulic cylinder 60 is controlled by a hydraulic control mechanism 64. The E-shaped bracket 62 has bearings 66. The tires 42 are connected to rotate a shaft 70, which in turn is connected to a first universal joint 72 and a second universal joint 74 to rotate a step up gear 76. The step up gear 76 is, in turn, connected to drive a generator 78 and thereby produce electricity.

Figure 12:
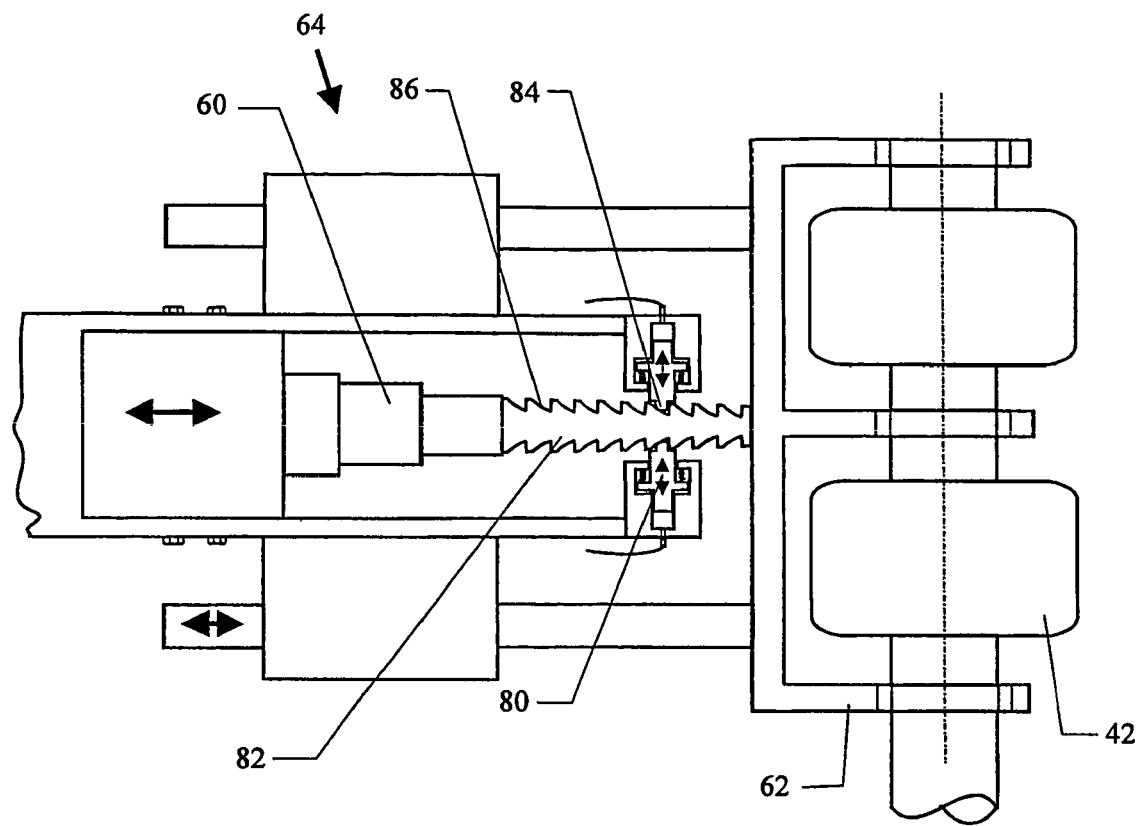
FIG. 12 is a schematic view of a tire assembly and hydraulic control mechanism.

In FIG. 12, there is shown a partial schematic side view of the hydraulic cylinder 60, the control mechanism 64 and the E-shaped bracket 62. The same reference numerals are used in FIG. 12 as those used in FIG. 11 for those components that are identical. It can be seen that the hydraulic cylinder 60 is mounted to move the tires 42 into and out of contact with the ring 26 (not shown in FIG. 12). The control mechanism 64 has two hydraulic cylinders 80 located on either side of a saw tooth connection rod 82. When both hydraulic cylinders 80 are in the extended position shown in FIG. 12, the tires cannot be moved further away from the ring 26 (not shown in FIG. 12). In other words, when the tires are forced against the ring 26 and the hydraulic cylinders 80 of the control mechanism 64 are extended, the tires will be locked into that position as the ends 84 of the hydraulic cylinders 80 will be inserted into the saw teeth 86 of the connection rod 82.

Figure 13:
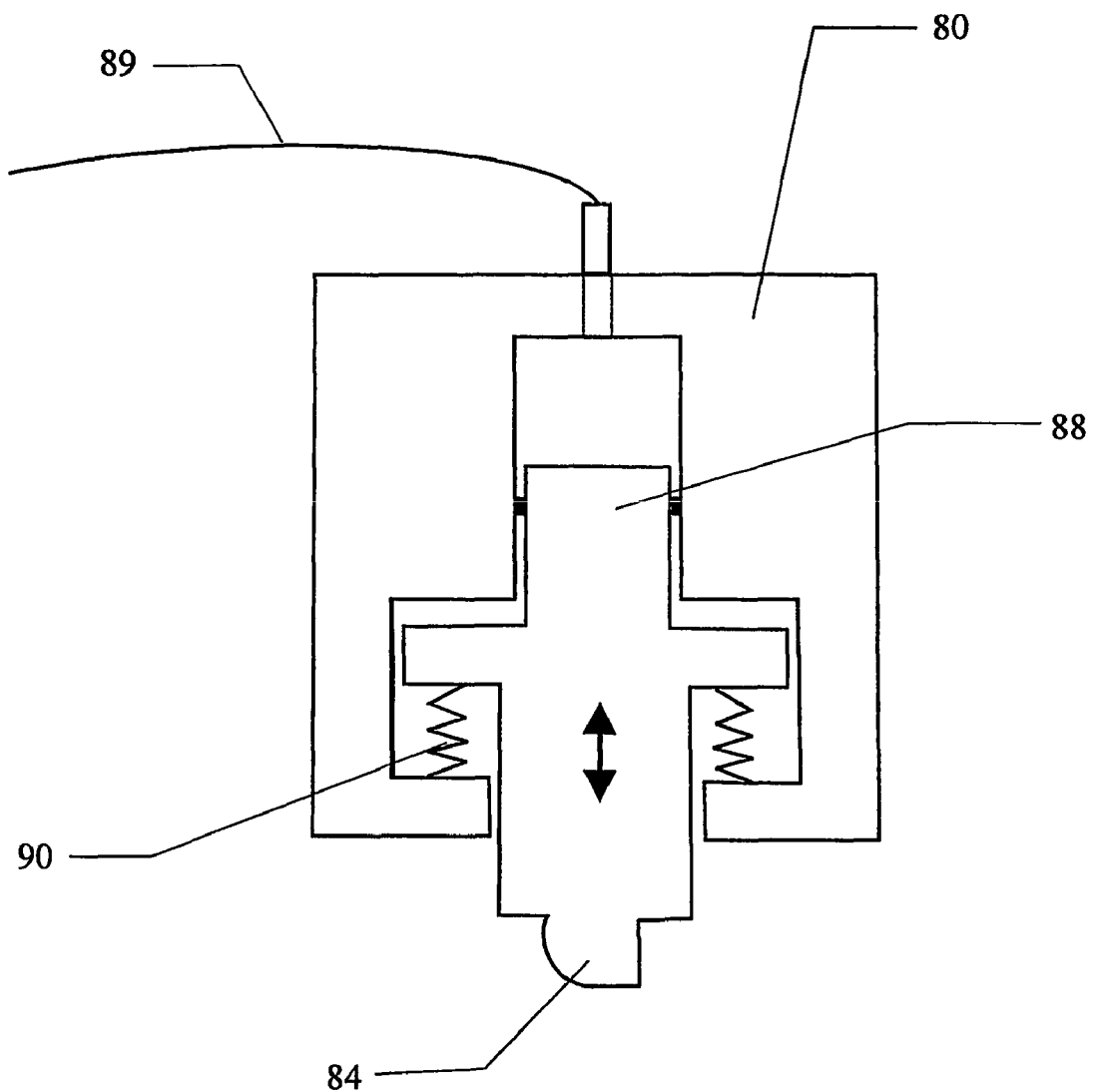
FIG. 13 is an enlarged schematic view of one side of an hydraulic control mechanism.

In FIG. 13, there is shown an enlarged side view of one of the hydraulic cylinders 80 having a piston 88 therein. A hydraulic line directs hydraulic fluid into the hydraulic cylinder 80 to force the piston outward, thereby extending the steel lock 84. When the pressure of the hydraulic fluid is released, springs 90 return the piston to an unextended position and the steel lock 84 is removed from the saw teeth 86 of the connection rod 82 (not shown in FIG. 13). From FIGS. 12 and 13, it can be seen that the saw teeth are shaped with an angled surface on one part of the saw tooth and a perpendicular surface on the other side of the saw tooth. The steel lock 84 is shaped similarly so that the hydraulic cylinder 60 can fairly easily force the tires 68 further against the ring 26 (not shown in FIGS. 12 and 13) but the tires will not easily move away from the ring 26 toward the cylinder 60.

Figure 14:
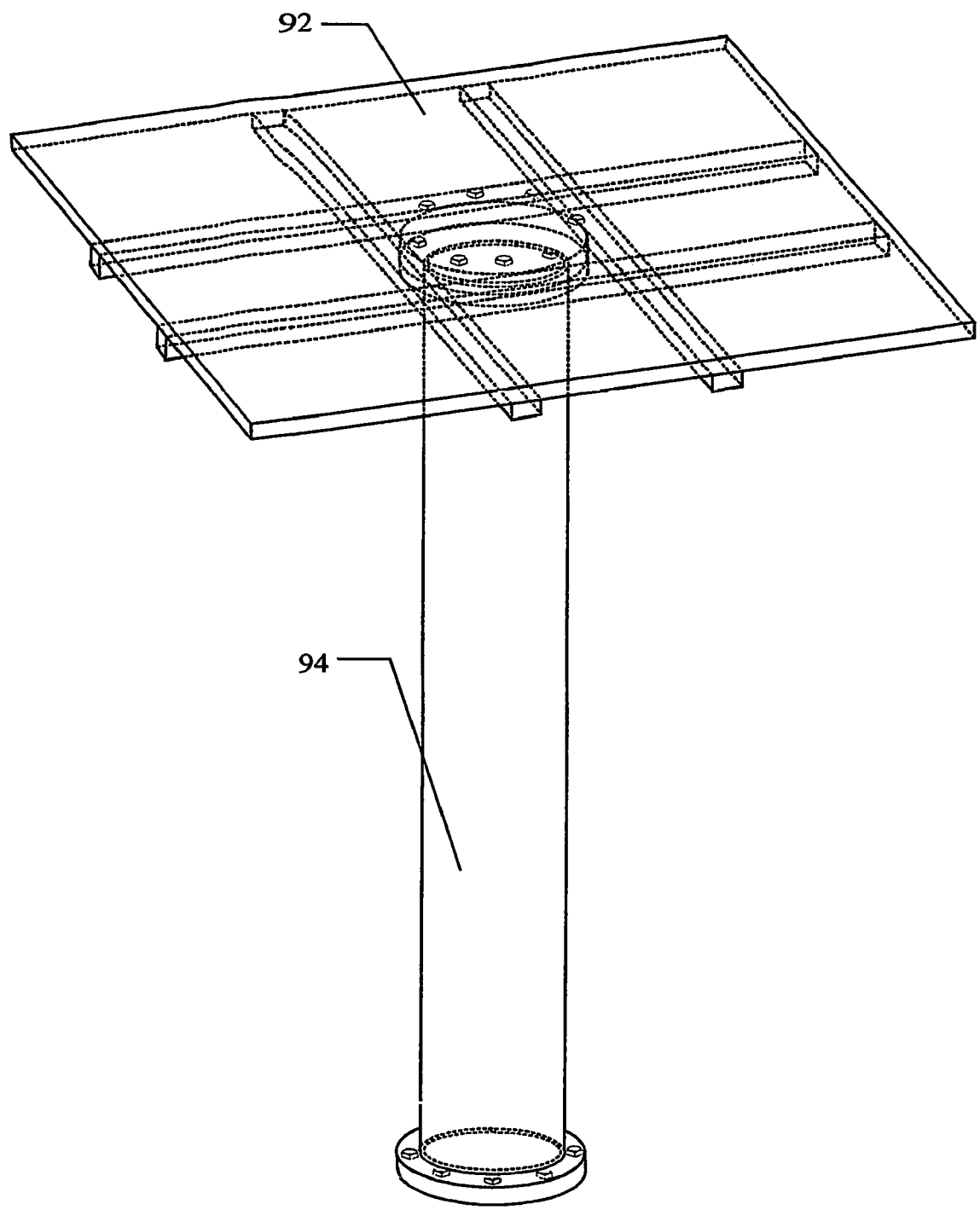
FIG. 14 is a perspective view of a generator base.
Figure 15:
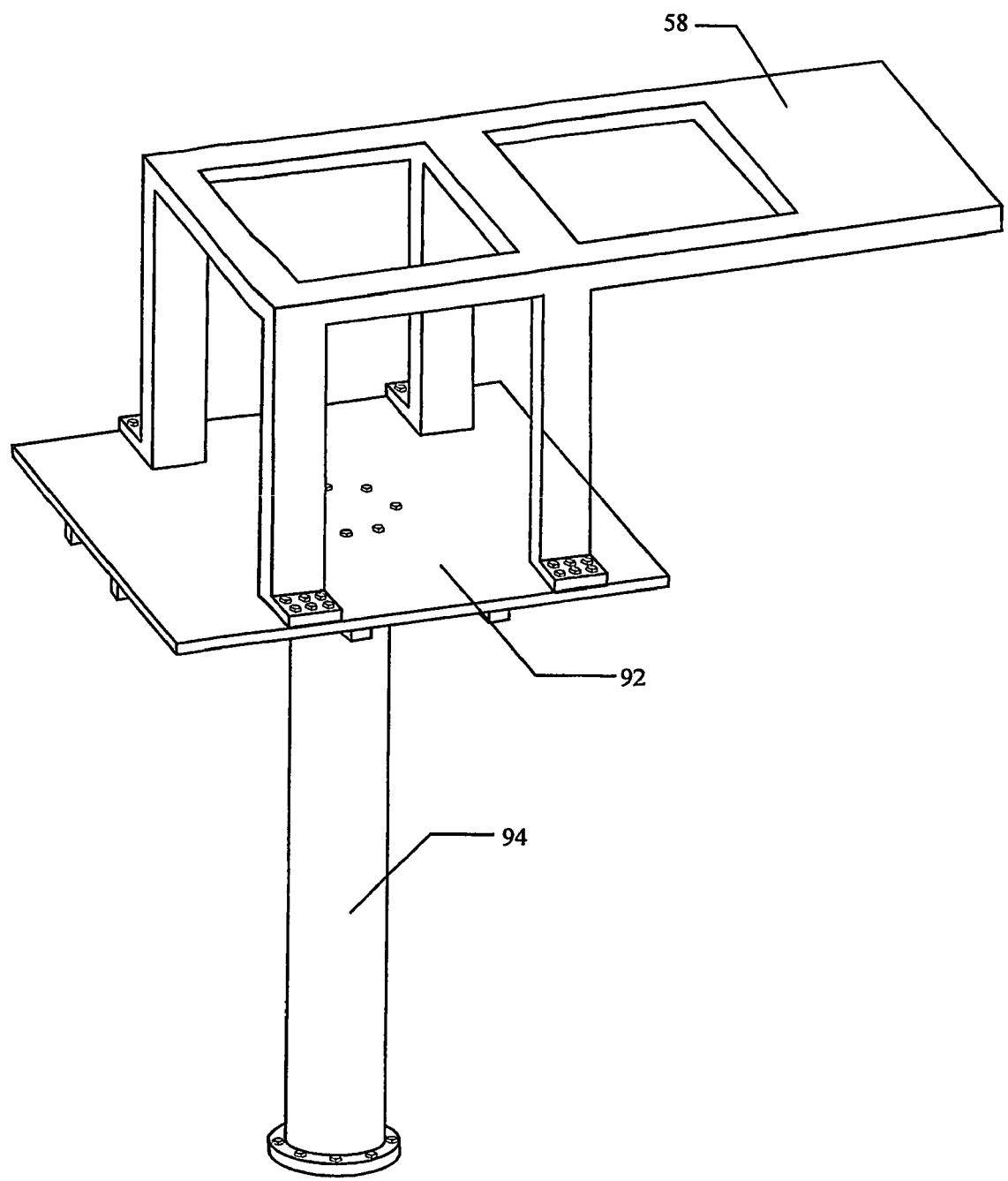
FIG. 15 is a perspective view of a generator base and tire mount assembly.

In FIGS. 14 and 15, there is shown a generator base 92 and the tire assembly mount 58. By comparing FIGS. 14 and 15 with FIG. 11, it can be seen that the generator base 92 provides support for the generator 78 and the step up gear 76. The generator base 92 has a column 94 supporting a flat surface 96. The columns 94 can be of varying length depending on the height desired for the flat surface 96. From FIG. 4, it can be seen that the generators are supported on columns of varying heighth in a bottom portion of the generator housing 10. In an upper portion of the generator housing 10, the generators are supported on support plates 24.

Figure 16:
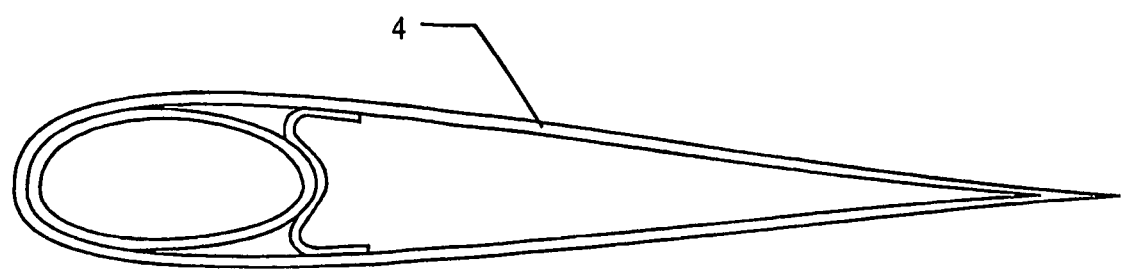
FIG. 16 is an end view of a blade section.

In FIG. 16, there is shown a section of a blade 4. Preferably, the blades are made of carbon fiber in combination with glass fiber and epoxy resin. Preferably, the outer layers are made of laminated fiber material and the inner much thicker layer is made from lighter supporting material.

Figure 17:
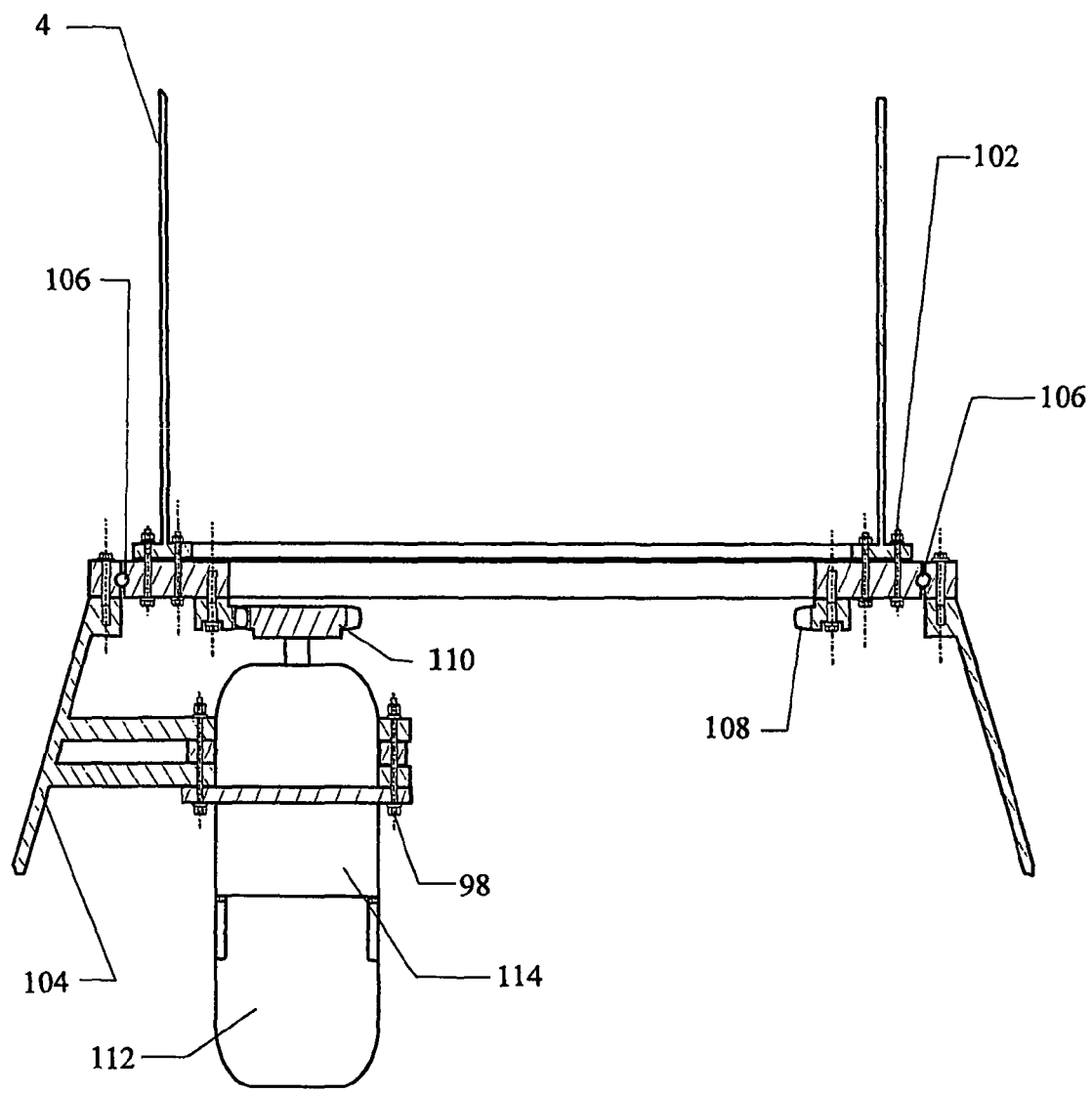
FIG. 17 is a sectional view of a pitch mechanism layout for each blade.

As shown in FIG. 17, the blade 4 has a flange 102 affixed to an inner end thereof. The flange 102 is bolted to a pitch mechanism 104. The pitch mechanism 104 has a pitch bearing 106, a pitch gear 108 that interacts with a pitch pinion 110. The pitch pinion is controlled by an electric motor 112 having a gear reducer 114 to rotate the pitch pinion 110. As the pitch pinion rotates, the pitch of the blade 4 can be varied. The electric motor 112 and the gear reducer 114 are bolted to the pitch mechanism 104.

Figure 18:
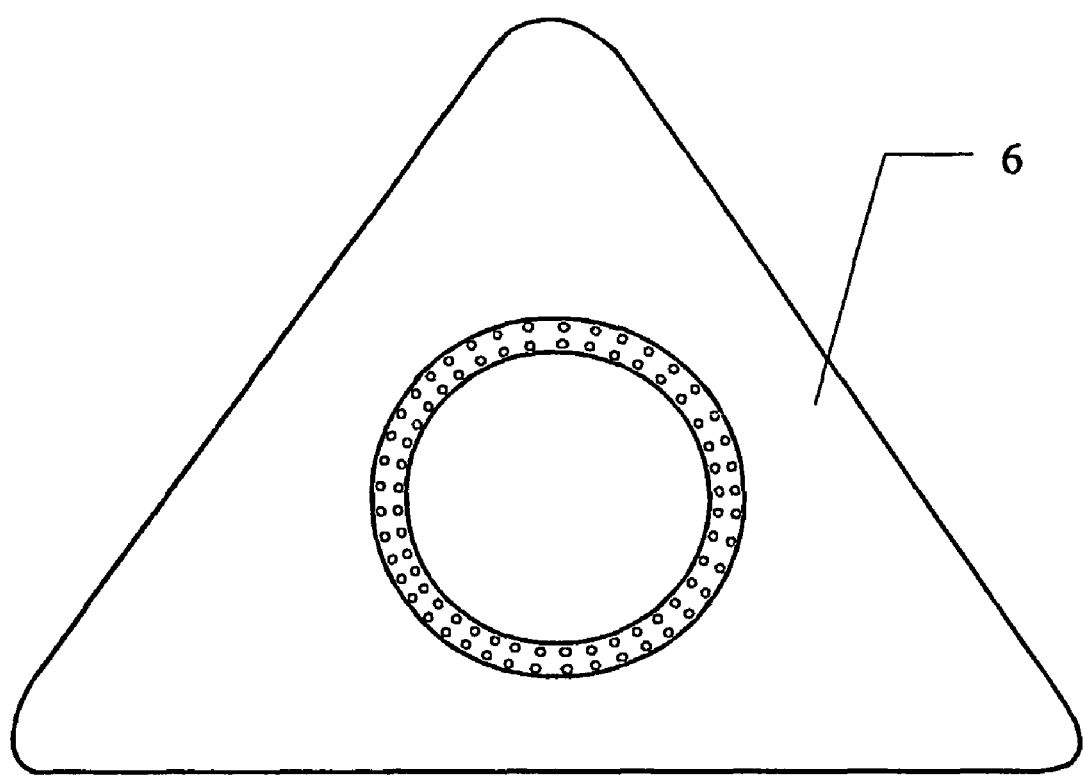
FIG. 18 is a front view of the hub.
Figure 19:
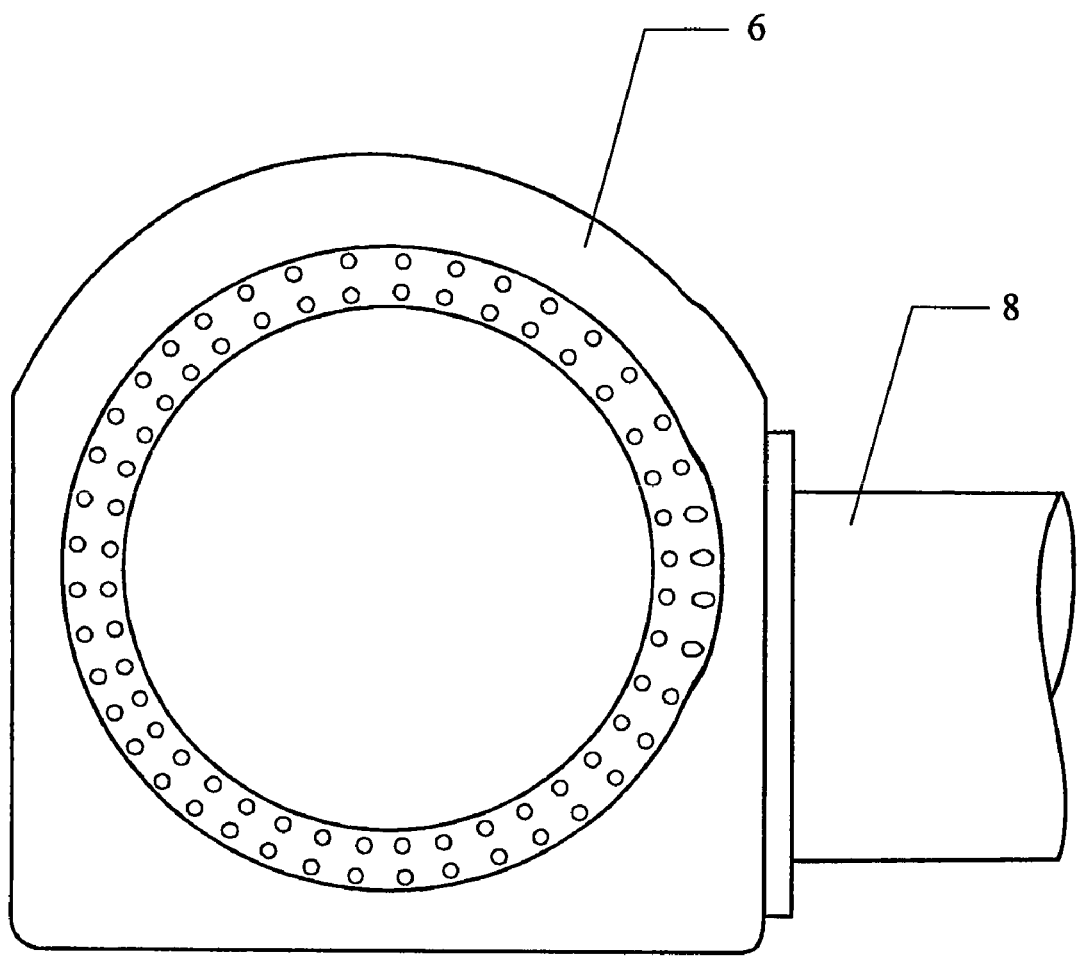
FIG. 19 is a side view of the hub.

In FIGS. 18 and 19, there is shown a front and side view respectively of the hub 6. The front of the hub 6 is connected to the shaft 8. The three sides of the hub 6 (only one of which is shown) are connected to the pitch mechanism 104 (not shown in FIGS. 18 and 19) for each blade, which in turn are connected to the connectors 98 and to the blades 4.

Figure 20:
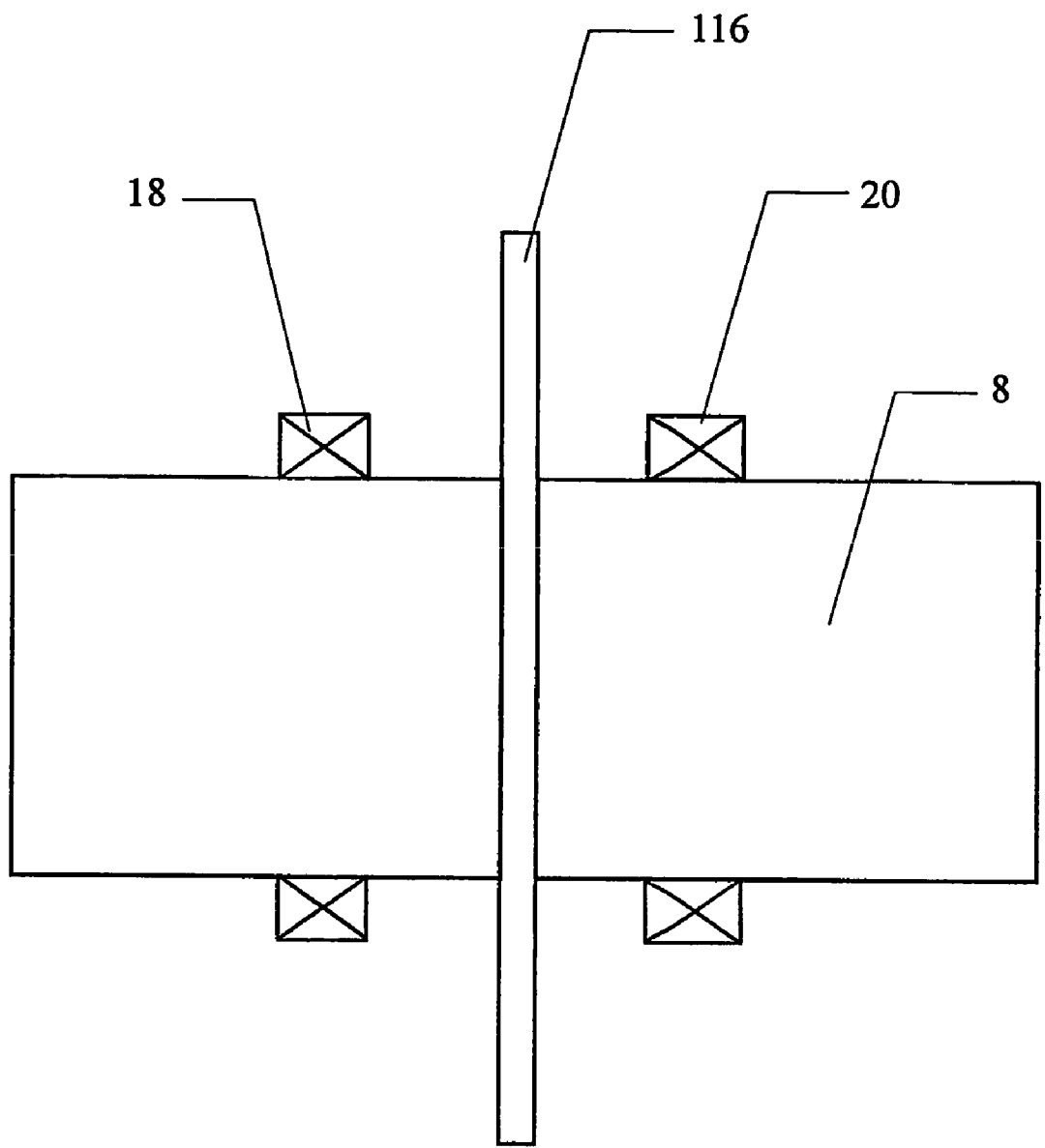
FIG. 20 is a schematic side view of a brake system.
Figure 21:
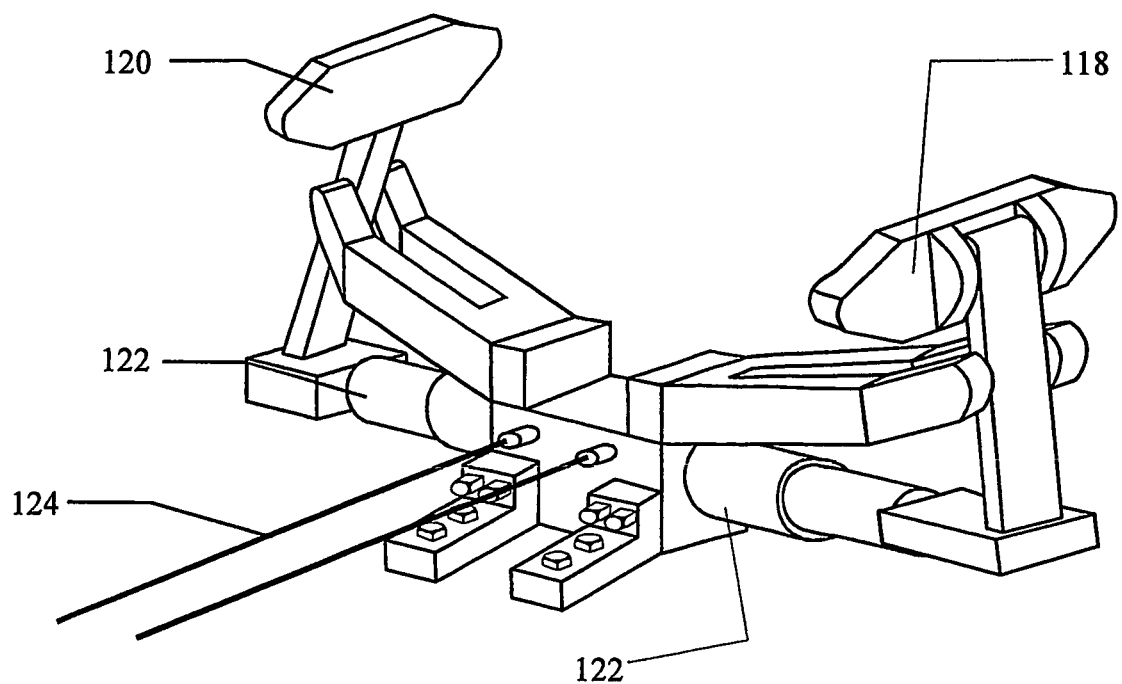
FIG. 21 is a perspective view of calipers of a brake system.
Figure 22:
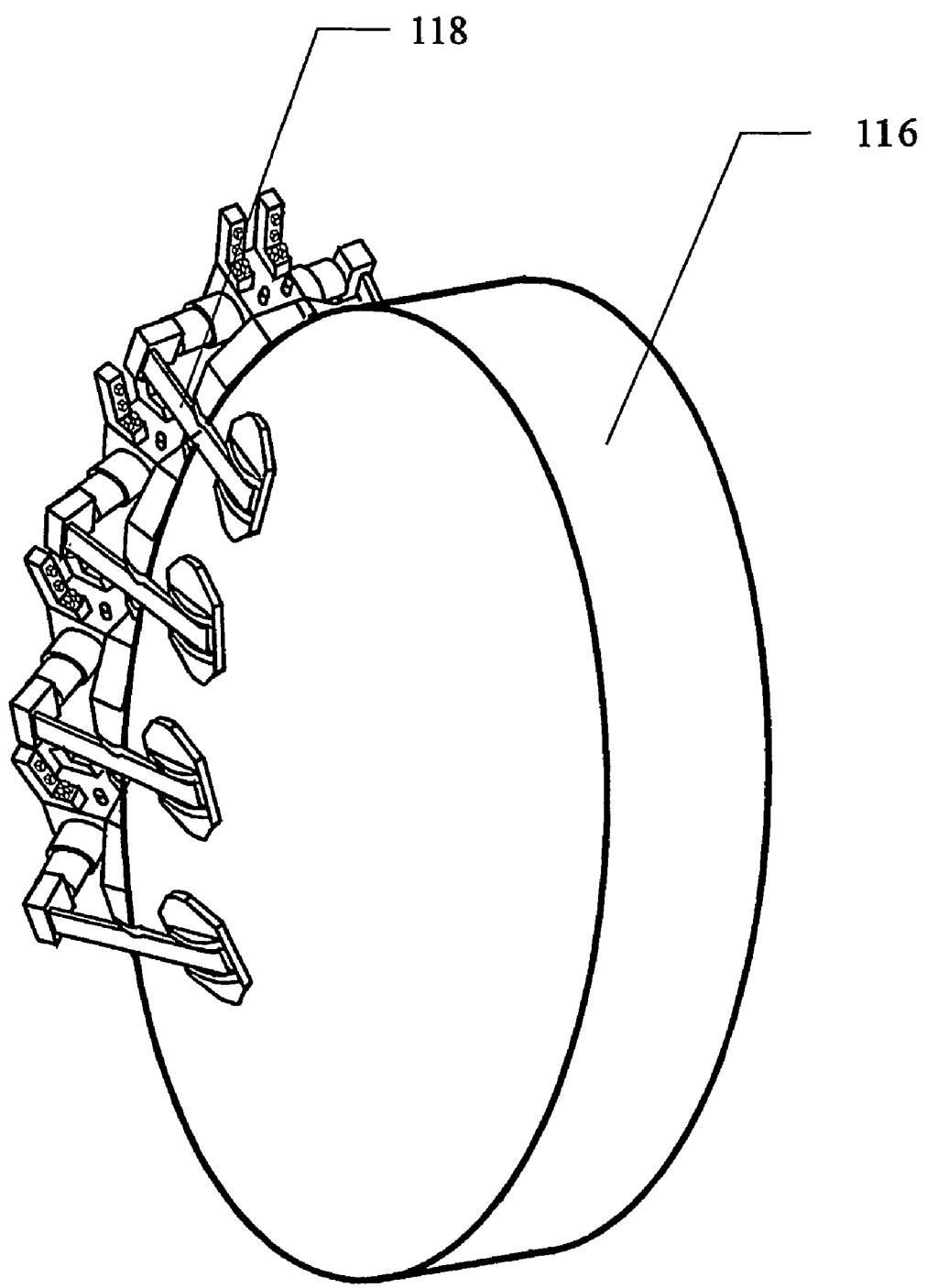
FIG. 22 is perspective view of calipers and a brake disc.

In FIGS. 20, 21 and 22, there is shown a brake system for the wind turbine. From FIG. 20, it can be seen that there is a brake disc 116 located between the front bearing 18 and the rear bearing 20 on the shaft 8. In FIG. 21, there is shown brake calipers 118 having two brake pads 120. One brake pad is located on one side of the brake disc 116 and the other brake pad is located on the other side of the brake disc 116. The brakes are operated hydraulically through hydraulic cylinders 122 connected to hydraulic supply lines 124. A schematic perspective view is shown in FIG. 22 of several brake calipers 118 being mounted around the circumference of the brake disc 116. The calipers and disc brake are conventional and are not further described.

Figure 23:
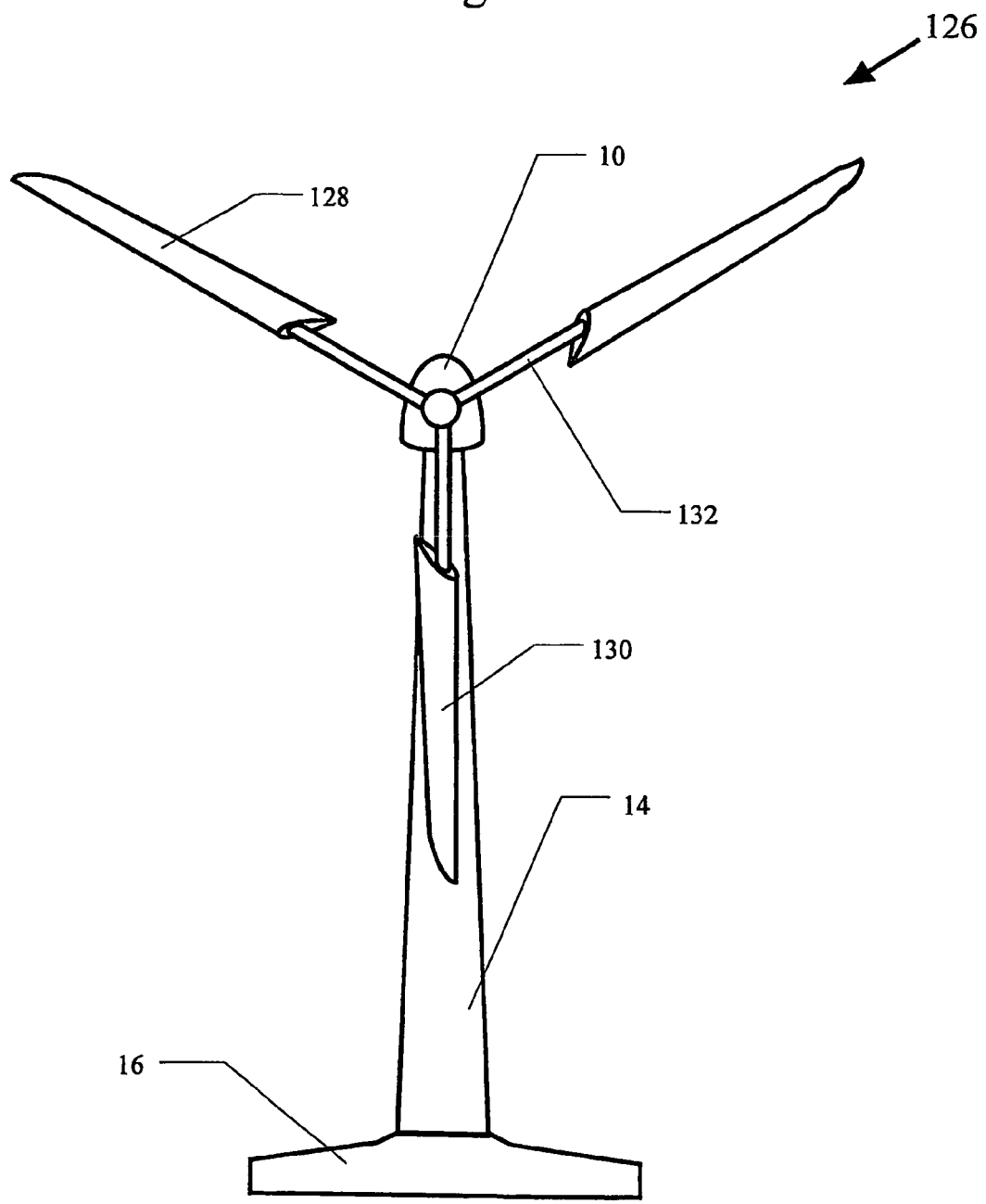
FIG. 23 is a front view of a second embodiment of a wind turbine.
Figure 24:
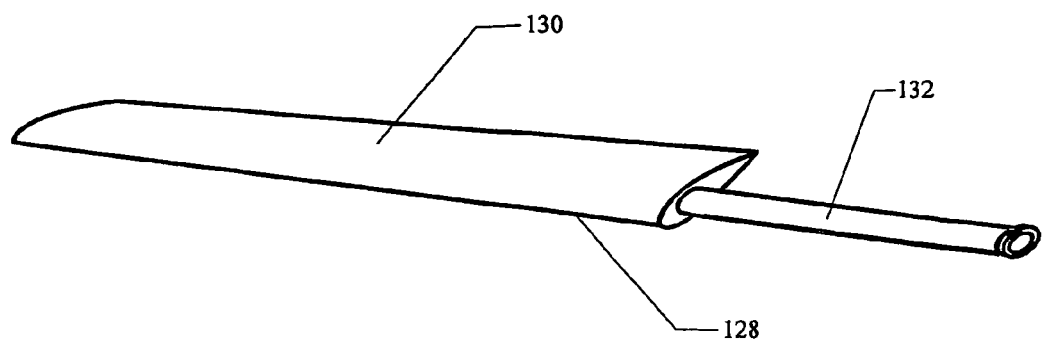
FIG. 24 is a perspective view of a blade of the second embodiment.
Figure 25:
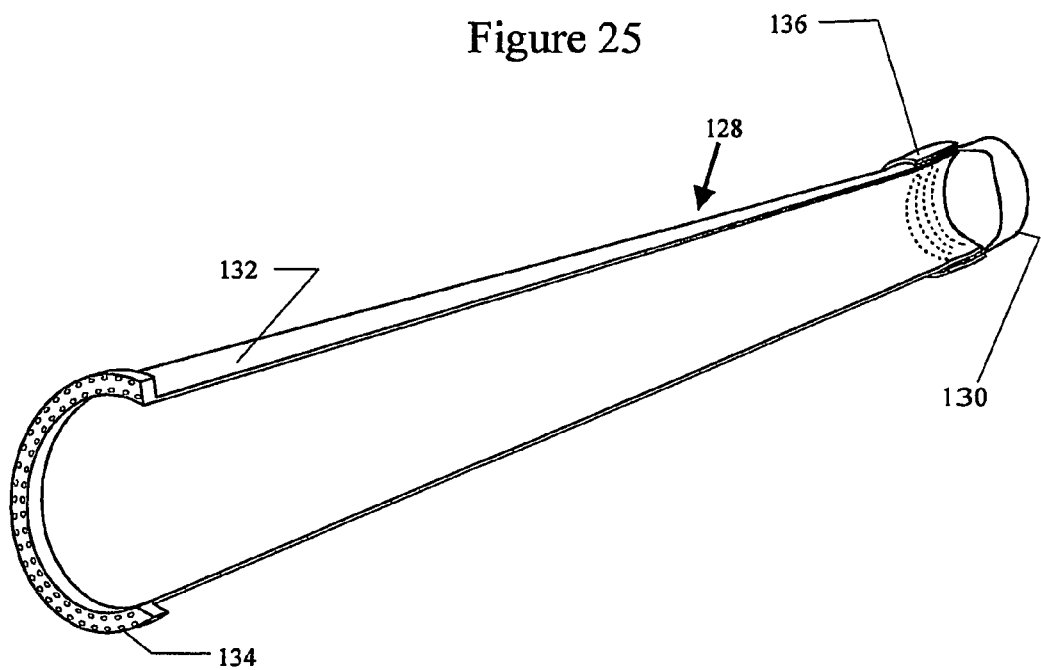
FIG. 25 is a perspective view of a blade hub connector for the second embodiment.

In FIGS. 23, 24 and 25, there is shown a further embodiment of a turbine 126 having three blades 128 that are different from the blade 4 as can be seen from FIG. 23, the blades 128 have an outer blade section 130 and an inner post section 132. The remaining components shown in FIG. 23 are identical to the components shown in FIG. 1 and are described using the same reference numerals.

Figure 26:
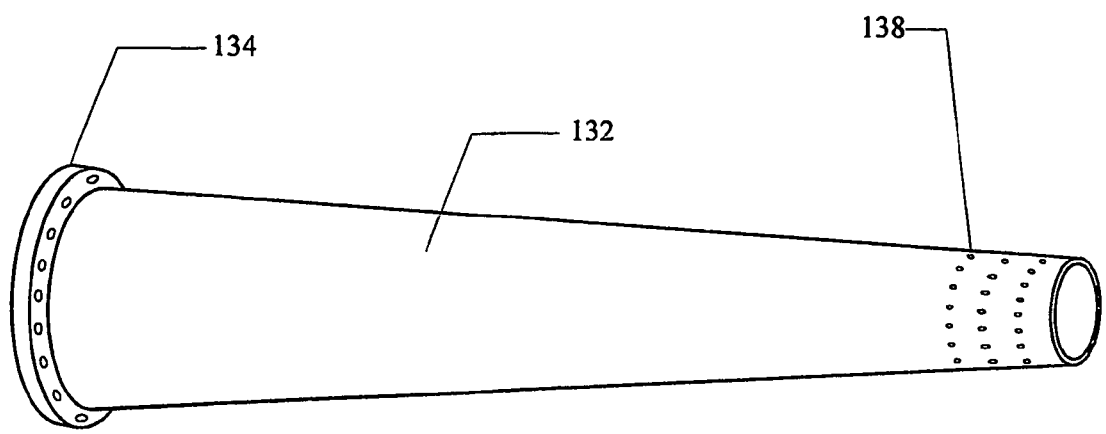
FIG. 26 is a perspective view of the connector of FIG. 25.
Figure 27:
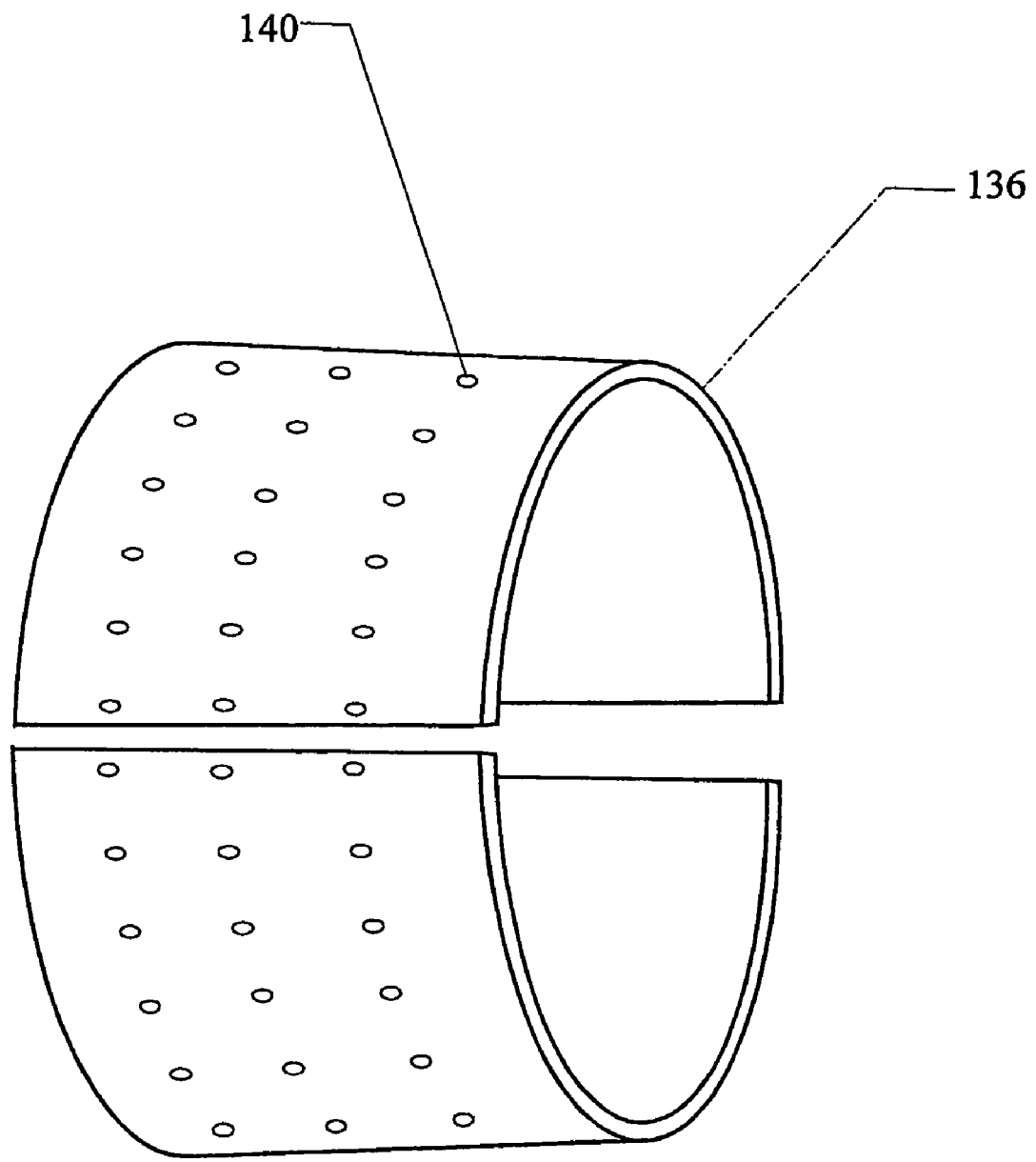
FIG. 27 is a perspective view of a collar.
Figure 28:
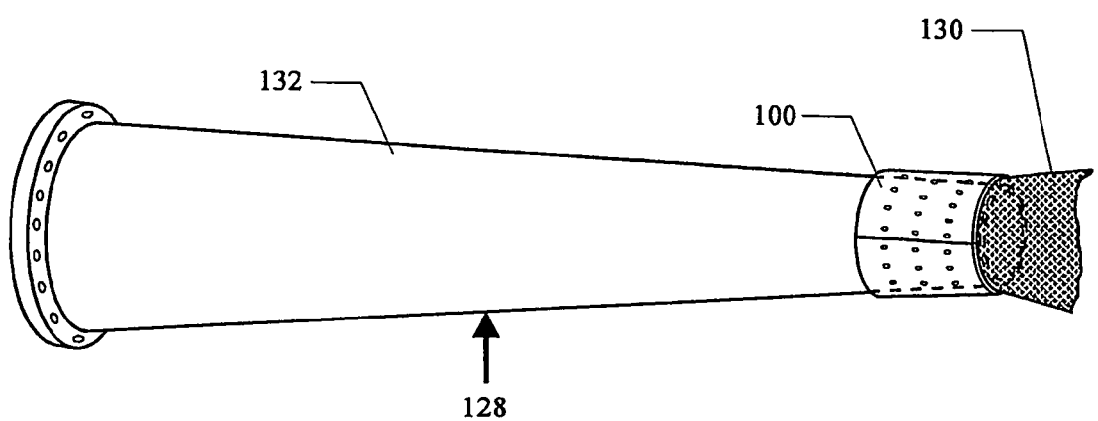
FIG. 28 is a partial perspective view of the blade-hub connection for the second embodiment.
Figure 29:
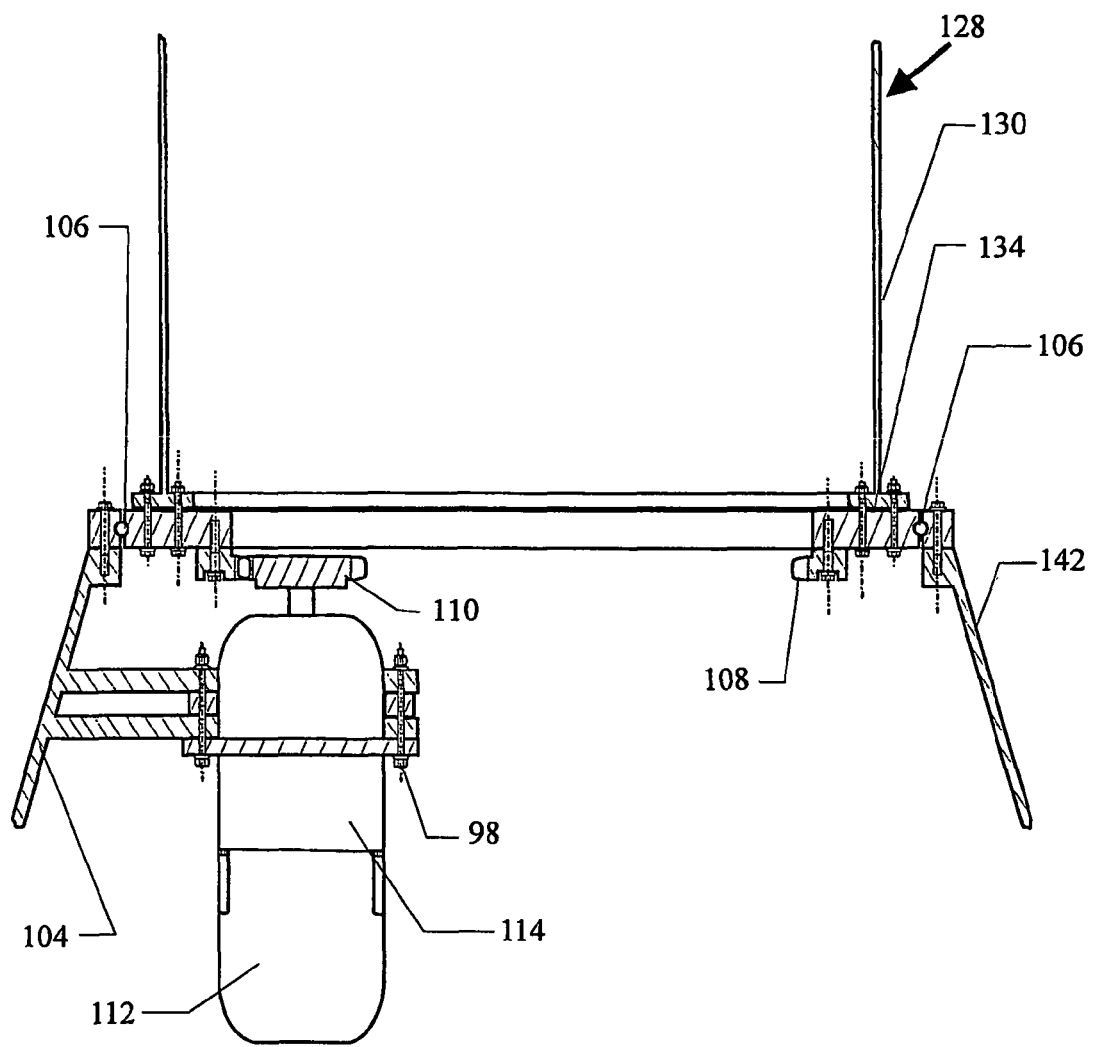
FIG. 29 is a side view of a pitch mechanism for the second embodiment.

In FIG. 24, there is shown a perspective view of one blade 128 having the blade section 130 and the post section 132. The blades 128 are longer than the blades 4 and catch the wind over a larger circumference. In FIG. 25, it can be seen that the post section 132 is an enlarged hub to blade connection having an outer flange 134 at an inner end and collar 136 at an outer end. The outer blade section 130 of the blade 128 is bolted into the outer end of the post section 132. In FIGS. 26, 27 and 28, there are shown further views of the blade to flange connection shown in FIG. 25. The same reference numerals are used in FIGS. 26, 27 and 28 as those used in FIG. 25 to describe those components that are identical. The outer end of the post section 132 has a series of openings 138 therein that correspond to openings 140 in the collar 136. The outer end of the post section 132 is designed to receive the outer blade portion 130 of the blade 128. As best shown in FIGS. 25 and 28, the outer blade portion 130 of the blade 128 is bolted or screwed into the inner post of the section 132. In FIG. 29, a pitch mechanism 142 is varied slightly from the pitch mechanism 104 to accommodate the different blades 128. The same reference numerals are used in FIG. 29 as those used in FIGS. 17 and 25 to 28 to describe those components that are identical. The inner post section 130. of the blade 128 has the flange 134 thereon.

Figure 30:
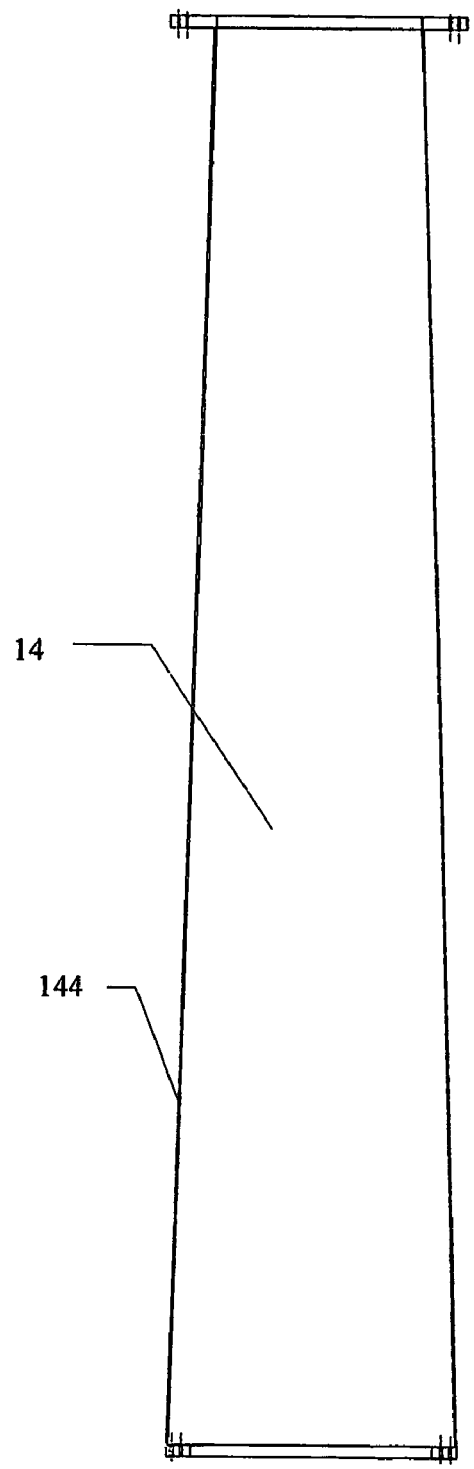
FIG. 30 is a side view of a first section of a tower.
Figure 31:
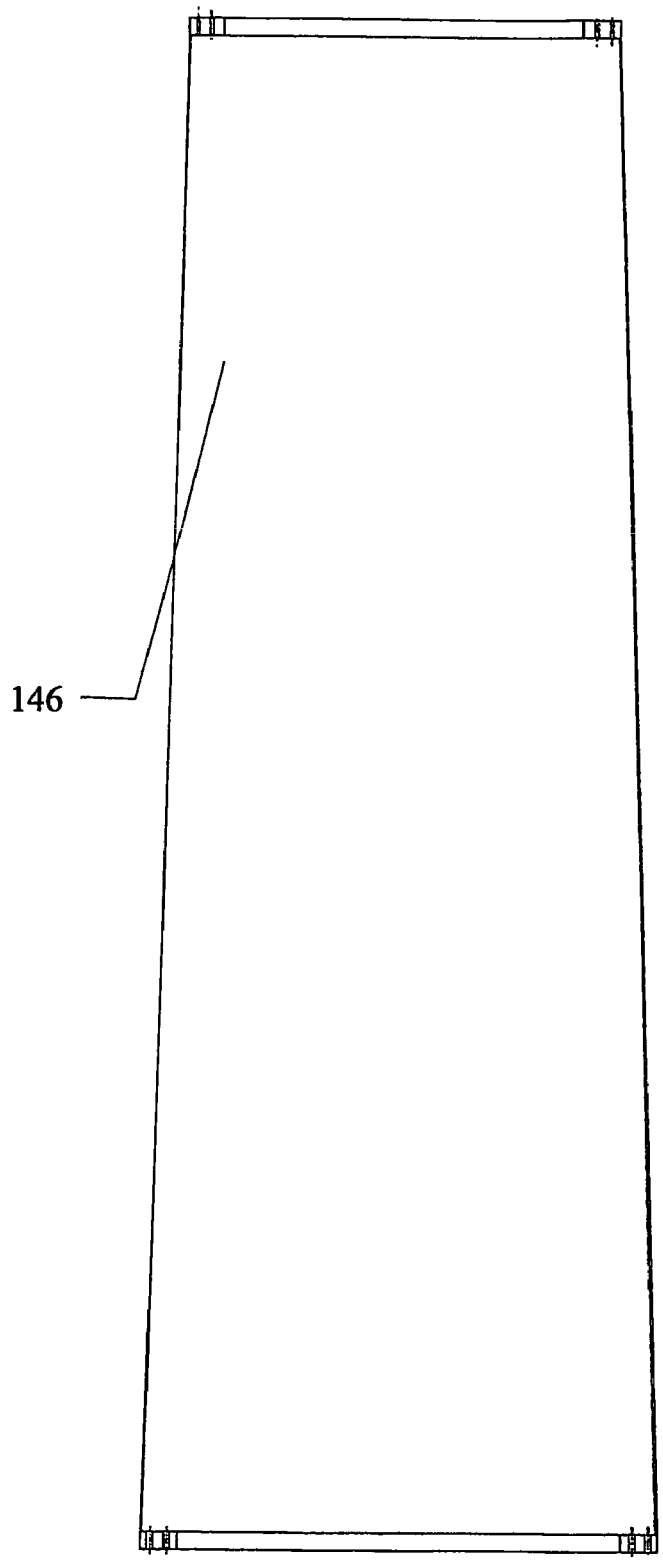
FIG. 31 is a side view of a second section of a tower.
Figure 32:
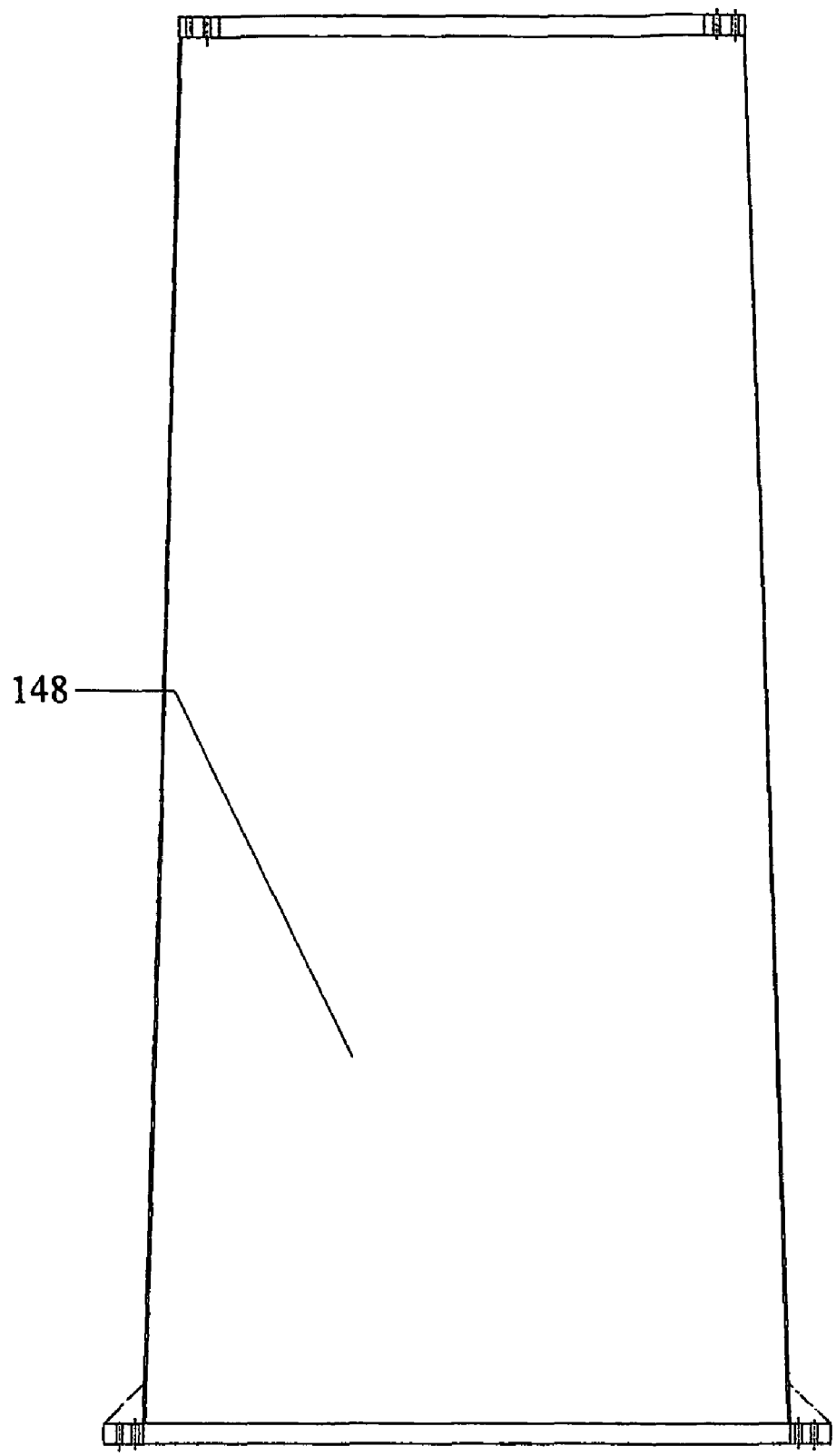
FIG. 32 is a side view of a third section of a tower.
Figure 33:
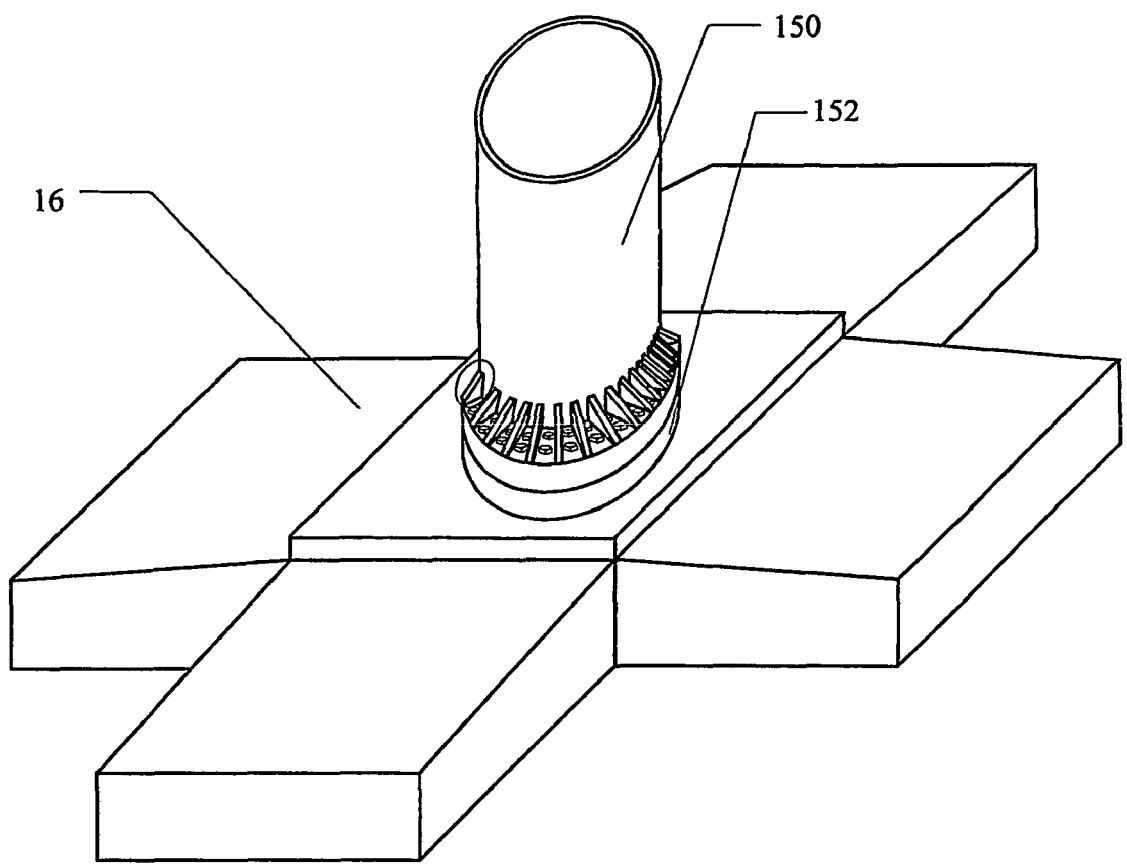
FIG. 33 is a perspective view of a foundation of a tower.
Figure 34:
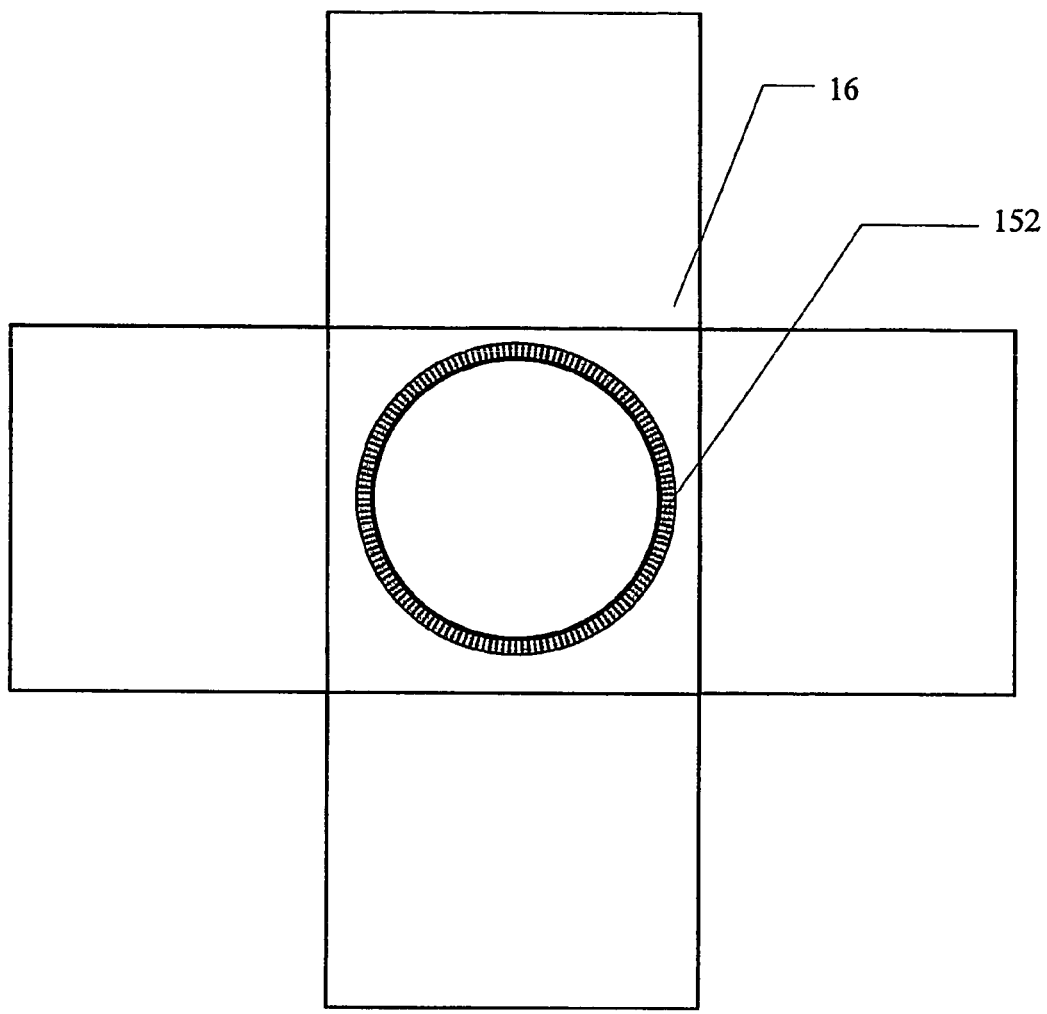
FIG. 34 is a top view of the foundation.
Figure 35:
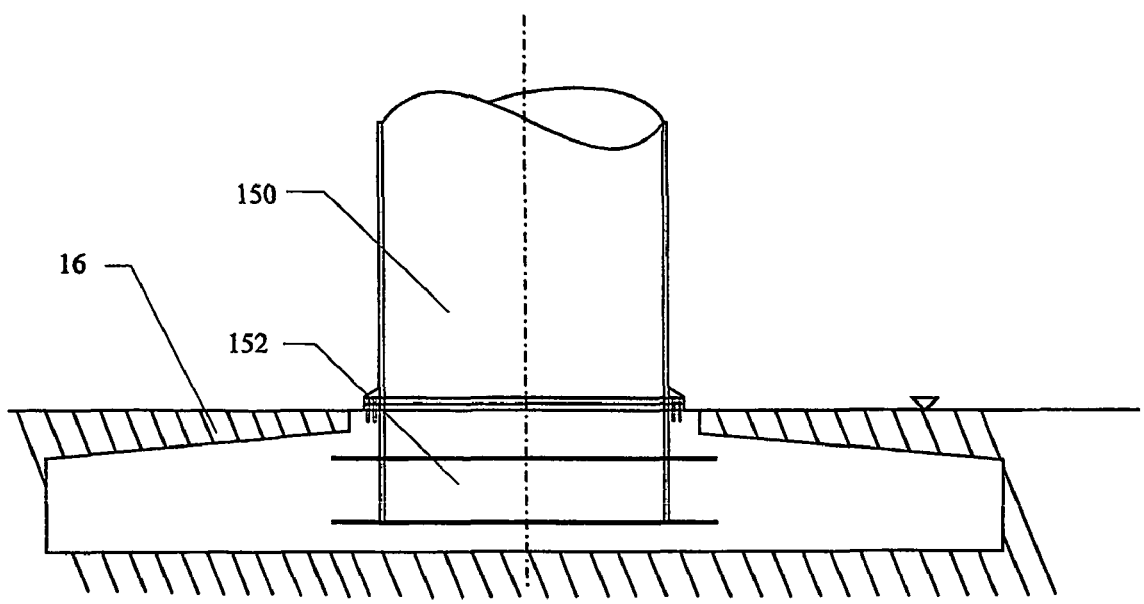
FIG. 35 is a sectional view of the foundation along the section A-A of FIG. 34.
Figure 36:
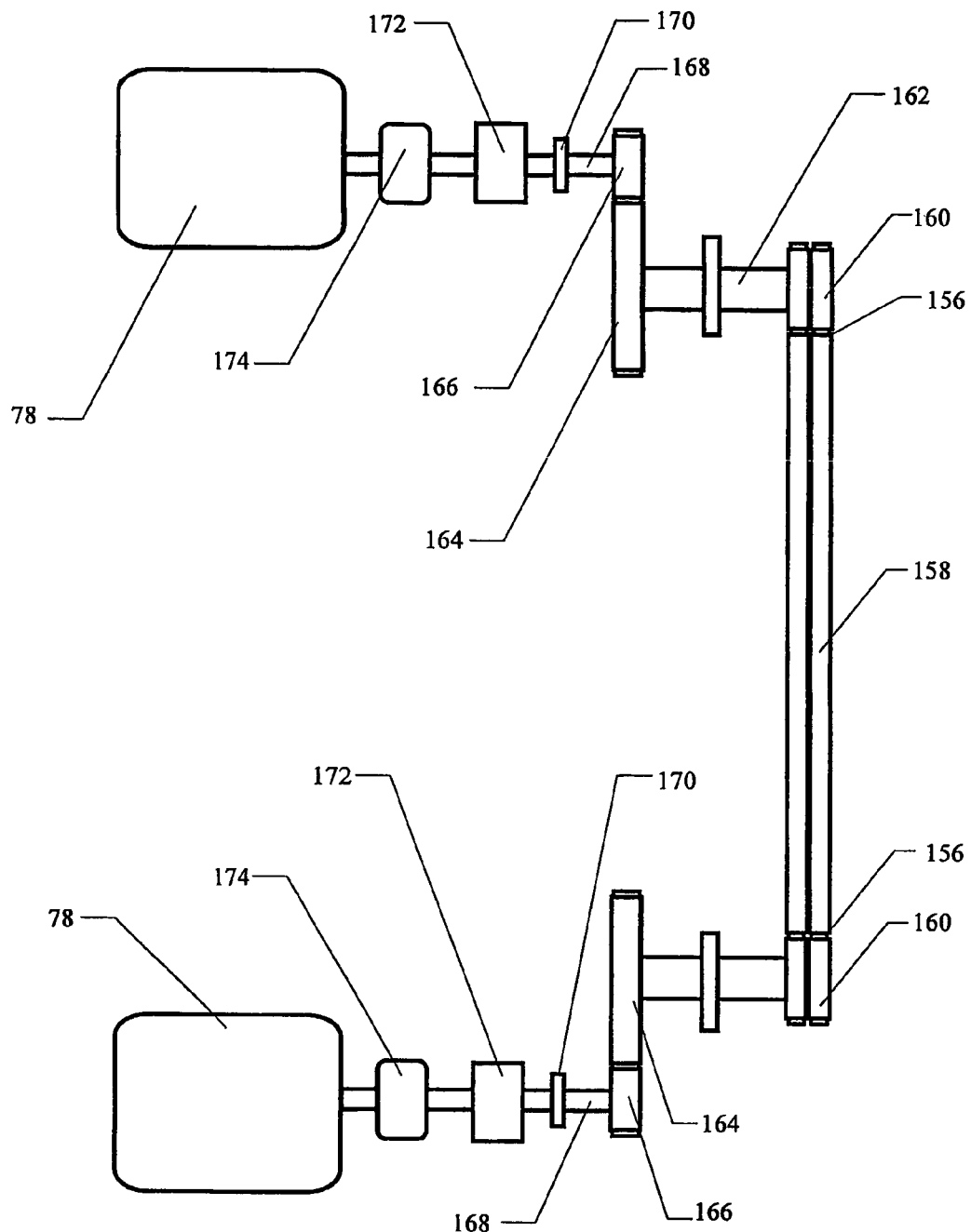
FIG. 36 is a further embodiment of a wind turbine where the ring is contacted by gears.
Figure 37:
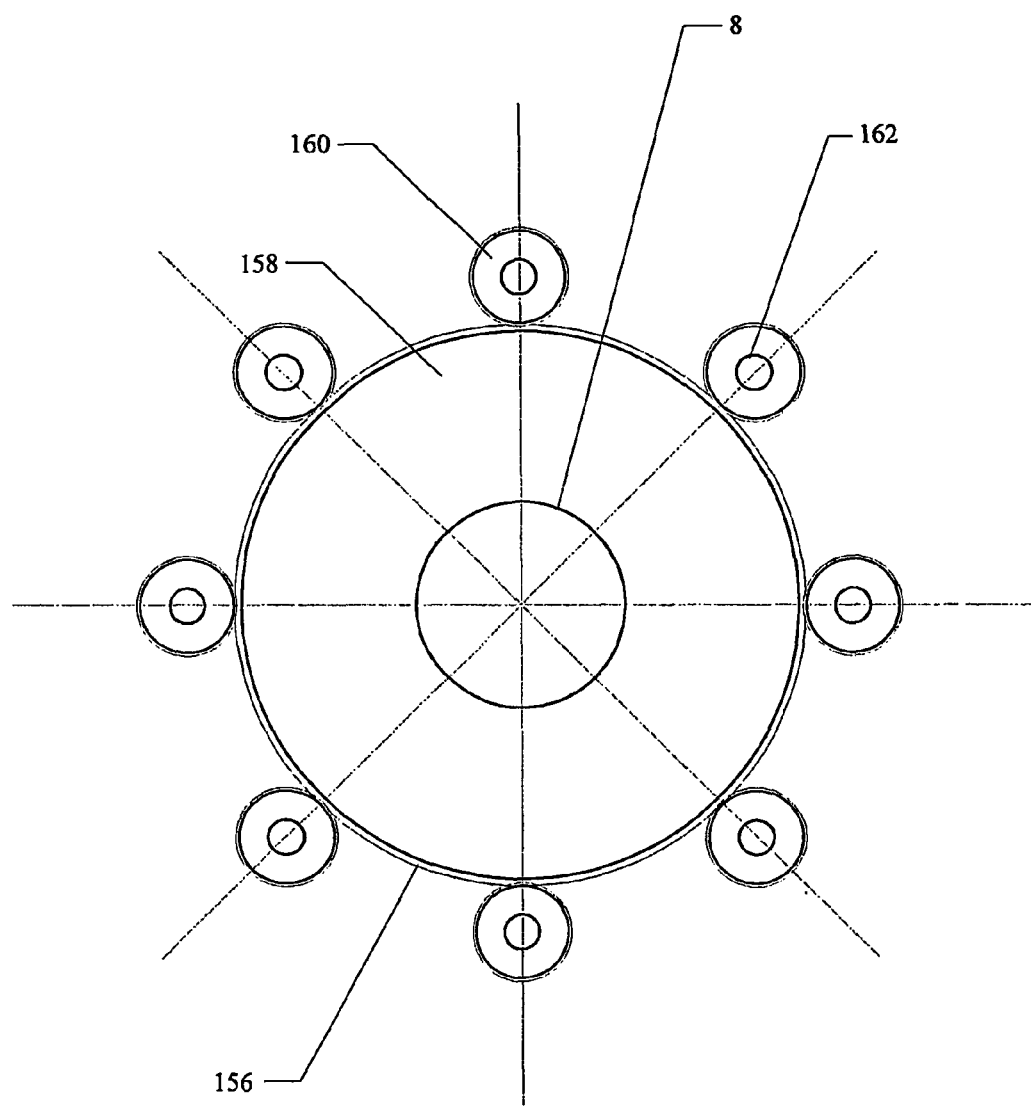
FIG. 37 is a sectional view of a gear arrangement along the section A-A of FIG. 36.
Figure 38:
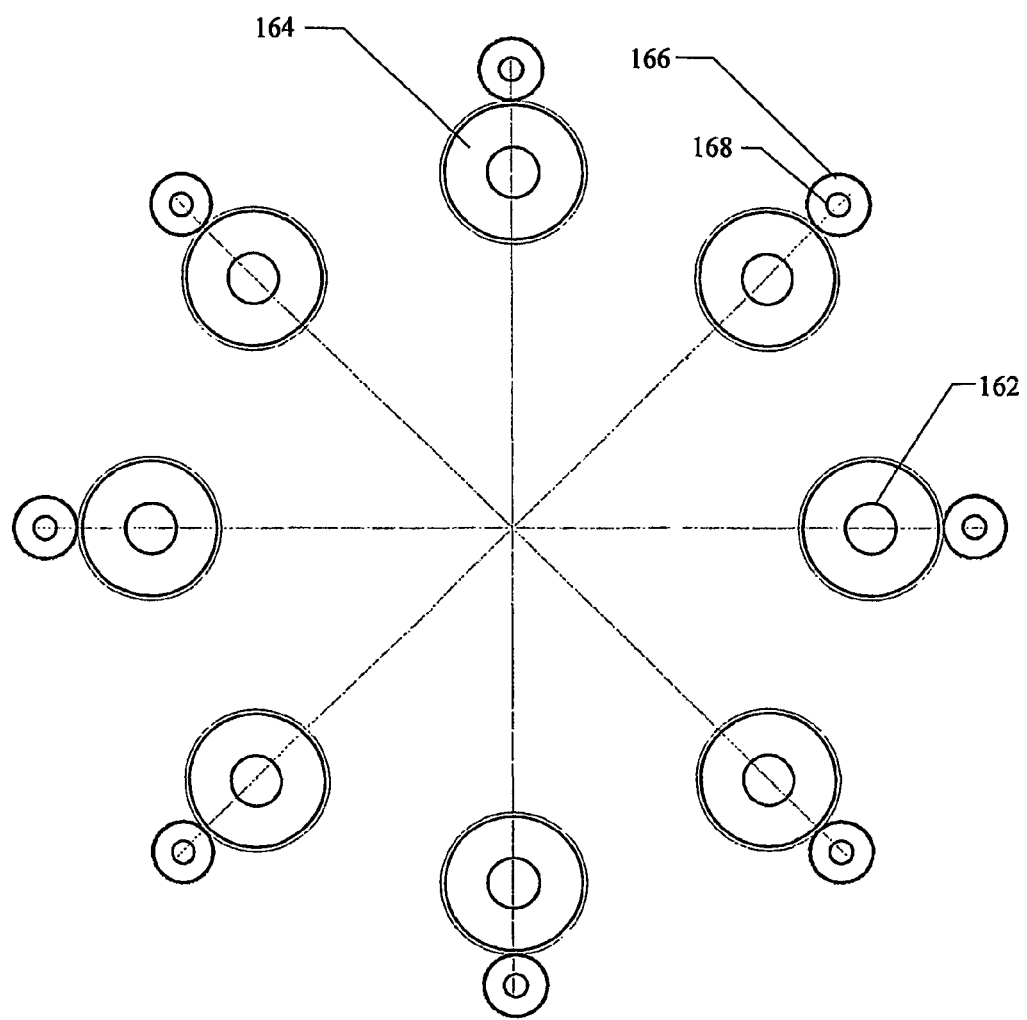
FIG. 38 is a side view of gears along section B-B of FIG. 36.

In FIGS. 30 to 35, the components of the tower 14 are shown. The tower has an upper section 144 as shown in FIG. 30, a middle section 146 as shown in FIG. 31 and a lower section 148 as shown in FIG. 32. A bottom section 150 is mounted on a base 152 of a foundation 16 as shown in FIGS. 33 to 35. In FIGS. 36 to 38, there is shown a further embodiment of the ring 26. Instead of having contact made by tires as thus far described, a ring 156 is located on a periphery of a plate 158. The ring 156 is periphery of the plate 158 and has ridges and indentations (not shown) thereon to intermesh with gears 160. The gears 160 take the place of the tires 68. The gears 160 are connected through a shaft 162 to intermesh with gears 164, which in turn intermesh with gears 166. Each of the gears 166 is connected to a shaft 168 having a flex coupling 170, a rotor brake 172 and a variable speed coupler 174 to drive a generator 78. The plate 158 rotates on the shaft 8 as shown in FIG. 37. In place of ridges and indentations and gears, the embodiment shown in FIGS. 36 to 38 can have metal wheels rather than ridges and indentations and gears. The metal wheels would be in frictional contact with one another. For example, the plate 158 would be a large wheel that would case the smaller wheels 160 to rotate.

Controls

Start Up of the Turbine:
1—Power up the pitch actuator.
2—Release the shaft brake.
3—Ramp the pitch position demand at a fixed rate to some starting pitch.
4—Wait until the rotor speed exceeds 12 rpm.
5—Engage the closed loop pitch control of speed.
6—Ramp the speed demand up to synchronous speed.
7—Wait until the speed has been close to the target speed for a specified time.
8—Engage the tire mechanism (or load generator if using second option "gears"), close the generator contactors.
9—Engage the closed loop pitch control of power, by controlling pitch and load on tire mechanism.
10—Ramp the power demand up to the rated power.

Pitch Control:

A closed-loop controller (software-based) will be used that automatically adjusts the operational state of the turbine in order to keep it on a pre-defined operating curve, this will include:
1—Controlling of blade pitch to accommodate free stream wind velocity providing optimum pitch angle to deliver the optimum power.
2—Controlling of blade pitch in order to regulate the power output of the turbine to the rated level in above-rated wind speed.
3—Control of blade pitch in order to follow a predetermined speed ramp during start-up or shut-down of the turbine.
4—Control of the loading of generators using the tire mechanism (or generator load control when using second option "gears"), providing a means to step-up or step-down with power generated accommodating variable wind speed.
5—Control of yaw motor in order to minimize the yaw tracking error.

Safety System:

The safety system is to be constructed of hard-wired fail-safe circuit linking a number of normally open relay contact that are held closed when the turbine is operating properly.

Then if any one of these contacts is lost, the safety system trips, causing the appropriate fail-safe actions to operate. This would include disconnecting all electrical systems from the supply, allowing fail-safe pitching to the feather position, and allowing the hydraulic applied shaft brake (or tire shaft brake) to come on.

The safety system would be tripped by any of the following:
1—Rotor over speed, reaching the hardware over speed limit. This is set higher than the software over speed limit which would cause the normal supervisory controller to initiate a shut-down.
2—Vibration sensor trip, which might indicate that a major structural failure has occurred, will use sensors on, tower, blades, hub, shaft, friction wheel, foundation.
3—Controller watch dog timer expired, the controller should have a watch dog timer which it resets every controller time step. If it not reset within this time; this indicates that the controller is faulty and the safety system should shut down the turbine.
4—Emergency stop button pressed by an operator.
5—Other fault indicating that the main controller might-not be able to control the turbine.

Generator Torque Control:
1—First option (friction wheel turbine):
Using 20 induction generators with rated power of 375 KW, control of the torque on the generators would be conducted by:

Controlling the field current to accommodate the delivered power to the generators by the tire mechanism.

Controlling the pressure applied on tire mechanism by controlling the force applied on each tire to transmit the required power.

Controlling the loading and unloading of the generators on the friction wheel, by engaging and disengaging the tires and generators.

2—Second option (ears wind turbine):

Using 8 induction generators each with rated power of 975 KW, control of the torque on the generators would be conducted by:

Controlling the field current to accommodate the delivered power to the generators by the tire mechanism.

Using the fluid coupling to provide the necessary power control to accommodate the power delivered to the generator.

Loading and unloading of the generators.

Yaw Control:

A yaw error signal from the nacelle-mounted wind vane is used to calculate a demand signal for the yaw actuator.

When the averaged yaw error exceeds a certain value, the electrical motor will be switched on allowing yawing at slow fixed rate in one or other direction, and switched off again after a certain time or when the nacelle has moved through a certain angle.

We claim:

1. A turbine powered by wind comprising a rotor on a shaft, said rotor having blades extending outward therefrom, said blades being shaped to rotate said shaft when a velocity of said wind exceeds a predetermined minimum, said shaft being rotatably supported on a support that moves said blades in a yaw movement into and out of said wind as said wind changes direction, said turbine having a pitch adjustment mechanism to change a pitch of said blades, said shaft having a ring concentrically mounted thereon separately from said blades, said ring being longitudinally offset along said shaft from said blades, a plurality of rotators mounted to removably contact said ring, said rotators being connected to drive energy producing equipment, said rotators being constructed to rotate with said ring when said rotators are in contact therewith, thereby driving said energy producing equipment when said wind rotates said blades, a controller connected to control a speed of said turbine when a velocity of said wind exceeds a predetermined minimum by adjusting a force of each of said rotators that are in contact with said ring and to control each contact between each of said rotators and said ring independently.

2. A turbine as claimed in claim 1 wherein said rotor has a hub thereon located between said shaft and said blades.

3. A turbine as claimed in claim 2 wherein each blade has a post extending outward from said hub with a blade-shaped portion mounted on an outer portion of said post.

4. A turbine as claimed in claim 1 wherein said ring has a plurality of spokes extending outward from a central portion thereof to support said ring.

5. A turbine as claimed in any one of claim 1, 2 or 4 wherein there are three blades mounted equidistant from one another on said turbine.

6. A turbine as claimed in any one of claim 1, 2 or 4 wherein said ring has a surface extending parallel to a surface of said shaft and the rotators are tires.

7. A turbine as claimed in any one of claim 1, 2 or 4 wherein said rotators are one selected from the group of tires, metal wheels and gears.

8. A turbine as claimed in any one of claim 1, 2 or 3 wherein said ring is a first gear located on a periphery of a plate that is concentrically mounted on said shaft and said rotators are second gears that intermesh with said first gear.

9. A turbine as claimed in any one of claim 1, 2 or 4 wherein said ring is made from metal and said rotators are metal wheels.

10. A turbine as claimed in any one of claim 1, 2 or 4 wherein said controller is connected to control brakes for said turbine.

11. A turbine as claimed in any one of claim 1, 2 or 4 wherein said ring has a significantly smaller diameter than a circumference through tips of said blades.

12. A turbine as claimed in any one of claim 1, 2 or 4 wherein said ring has a plate with a surface thereon extending parallel to a surface of said shaft, said surface of said plate providing a contact surface for said rotators.

13. A method of operating a turbine powered by wind, said turbine having a rotor on a shaft, said rotor having blades extending outwards therefrom, said blades being shaped to rotate said shaft when a velocity of said wind exceeds a predetermined minimum, said shaft being rotatably supported on a support that moves said blades in a yaw movement into and out of said wind as said wind changes direction, said turbine having a pitch adjustment mechanism, said shaft having a ring concentrically mounted thereon separately from said blades, said ring being longitudinally offset along said shaft from said blades, a plurality of rotators mounted to removably contact said ring, said rotators being connected to drive energy producing equipment, said rotators being constructed to rotate with said ring when said rotators are in contact therewith, thereby driving said energy producing equipment when said wind rotates said blades, a controller connected to control a speed of rotation of said turbine when velocity of said wind exceeds a predetermined minimum and to independently control each contact between said rotators and said ring, said method comprising controlling said speed with varying wind conditions as said blades are rotating by adjusting a number of rotators that are in contact with said ring using said controller and using said controller to adjust a force of said rotators that are in contact with said ring.

14. A method as claimed in claim 13 including the steps of controlling said speed by using said controller to adjust a number of generators that are driven by said rotators that are in contact with said ring.

15. A method as claimed in claim 14 including the steps of using said controller to constantly monitor said turbine and said wind conditions and changing said number of rotators in contact with said ring and a force of each rotator in contact with said ring and to adjust one or more of said pitch of said blades, a yaw position of said turbine, and the application or release of brakes on said turbine in response to changing wind conditions.

16. A turbine powered by wind comprising a rotor on a shaft, said rotor having blades extending outward therefrom, said blades being shaped to rotate said shaft when a velocity of said wind exceeds a predetermined minimum, said shaft being rotatably supported on a support that moves said blades in a yaw movement into and out of said wind as said wind changes direction, said turbine having a pitch adjustment mechanism to change a pitch of said blades, said shaft having a ring concentrically mounted thereon, said ring being a first gear located on a periphery of a plate that is concentrically mounted on said shaft and said rotators are second gears that intermesh with said first gear; said ring being longitudinally offset along said shaft from said blades, a plurality of rotators mounted to removably contact said ring, said rotators being connected to drive energy producing equipment, said rotators being constructed to rotate with said ring when said rotators are in contact therewith, thereby driving said energy producing equipment when said wind rotates said blades, a controller connected to control a speed of said turbine when a velocity of said wind exceeds a predetermined minimum by adjusting a force of each of said rotators that are in contact with said ring and to independently control each contact between said rotators and said ring.

17. A wind turbine as claimed in claim 16 wherein said rotor has a hub thereon rotated between said shaft and said blades.

18. A wind turbine as claimed in claim 17 wherein each blade has a post extending outward from said hub with a blade-shaped portion mounted on an outer portion of said post.

19. A wind turbine as claimed in claim 16 wherein said ring has a plurality of spokes extending outward from a central portion thereof to support said ring.

20. A wind turbine as claimed in claim 18 wherein said rotators are tires.

21. A turbine powered by wind comprising a rotor on a shaft, said rotor having blades extending outward therefrom, said blades being shaped to rotate said shaft when a velocity of said wind exceeds a predetermined minimum, said shaft being rotatably supported on a support that moves said blades in a yaw movement into and out of said wind as said wind changes direction, said turbine having a pitch adjustment mechanism to change a pitch of said blades, said shaft having a ring concentrically mounted thereon separately from said blades, said ring being longitudinally offset along said shaft from said blades, a plurality of rotators mounted to removably contact said ring, said rotators being connected to drive energy producing equipment, said rotators being constructed to rotate with said ring when said rotators are in contact therewith, thereby driving said energy producing equipment when said wind rotates said blades, a controller connected to control a speed of said turbine when a velocity of said wind exceeds a predetermined minimum by adjusting a force of each of said rotators that are in contact with said ring.

22. A turbine as claimed in claim 21 wherein said controller is connected to control each contact between each of said rotators and said ring independently and to control the speed of said turbine by controlling a number of rotators that are in contact with said ring.

23. A turbine as claimed in claim 22 wherein said controller is connected to control said speed of said turbine by adjusting one or more of said pitch of said blades, a yaw position and applying or releasing brakes on said turbine in response to changing wind conditions.

* * * * *